(12) United States Patent
Nakajo

(10) Patent No.: US 10,748,328 B2
(45) Date of Patent: Aug. 18, 2020

(54) RECORDING MEDIUM, INFORMATION PROCESSING APPARATUS, INFLUENCE DEGREE DERIVING METHOD, AND IMAGE GENERATION METHOD

(71) Applicant: Live2D Inc., Tokyo (JP)

(72) Inventor: Tetsuya Nakajo, Tokyo (JP)

(73) Assignee: Live2D Inc., Tokyo (JP)

( * ) Notice: Subject to any disclaimer, the term of this patent is extended or adjusted under 35 U.S.C. 154(b) by 149 days.

(21) Appl. No.: 16/169,894

(22) Filed: Oct. 24, 2018

(65) Prior Publication Data

US 2019/0073823 A1 Mar. 7, 2019

Related U.S. Application Data

(63) Continuation of application No. PCT/JP2017/015902, filed on Apr. 20, 2017.

(30) Foreign Application Priority Data

Apr. 28, 2016 (JP) ................................. 2016-091536

(51) Int. Cl.
*G06T 15/20* (2011.01)
*G06T 13/80* (2011.01)
*G06T 7/11* (2017.01)
*H04N 13/122* (2018.01)
(Continued)

(52) U.S. Cl.
CPC ............. *G06T 15/205* (2013.01); *G06F 9/06* (2013.01); *G06F 17/11* (2013.01); *G06T 7/11* (2017.01); *G06T 13/80* (2013.01); *H04N 13/122* (2018.05)

(58) Field of Classification Search
None
See application file for complete search history.

(56) References Cited

U.S. PATENT DOCUMENTS 4,580,219 A * 4/1986 Pelc ...................... G06T 11/005
382/131

FOREIGN PATENT DOCUMENTS

| JP | H06-505817 A | 6/1994 |
| JP | 2008-217243 A | 9/2008 |
| JP | 2011-039828 A | 2/2011 |

(Continued)

OTHER PUBLICATIONS

Li et al. "Animating cartoon faces by multi-view drawings." Computer Animation and Virtual Worlds 21.3-4 (2010): 193-201. (Year: 2010).*

(Continued)

*Primary Examiner* — Ke Xiao
*Assistant Examiner* — Jed-Justin Imperial
(74) *Attorney, Agent, or Firm* — Merchant & Gould P.C.

(57) ABSTRACT

An information processing apparatus acquires information representing an angle concerning a view direction for each of a first view direction, a second view direction, and a third view direction and an output view direction. The apparatus derives the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

17 Claims, 18 Drawing Sheets

(51) Int. Cl.
*G06F 9/06* (2006.01)
*G06F 17/11* (2006.01)

(56) References Cited

FOREIGN PATENT DOCUMENTS

JP 2016-57691 A 4/2016
WO 92/09966 A1 6/1992

OTHER PUBLICATIONS

Hiroaki Gohara et al., "Cartoon Facial Animation with Minimal 2D Input Based on Non-linear Morphing", Proceedings 2 of the IEICE General Conference for Information/System, D-11-81, IEICE, 2010.
Yasuhiro Mukaigawa et al., "Synthesis of Facial Views with Arbitrary Poses and Expressions using Multiple Facial Images", Journal of IEICE, vol. J80-DII, No. 6, pp. 1555-1562, Jun. 1997.
Chie Furusawa et al., "Automatic Generation of Character Face Rotation Scenes from Front and Side Illustration", IPSJ SIG Technical Report, vol. 2014-CG-156 No. 8, Sep. 2014.
Satoshi Yaguchi et al., "Arbitrary View Generation from Uncalibrated Multiple View Camera System", Transactions of IPSJ, vol. 42, SIG 6 (CVIM 2), Jun. 2001.
International Search Report for PCT/JP2017/015902 dated Jul. 18, 2017.

\* cited by examiner

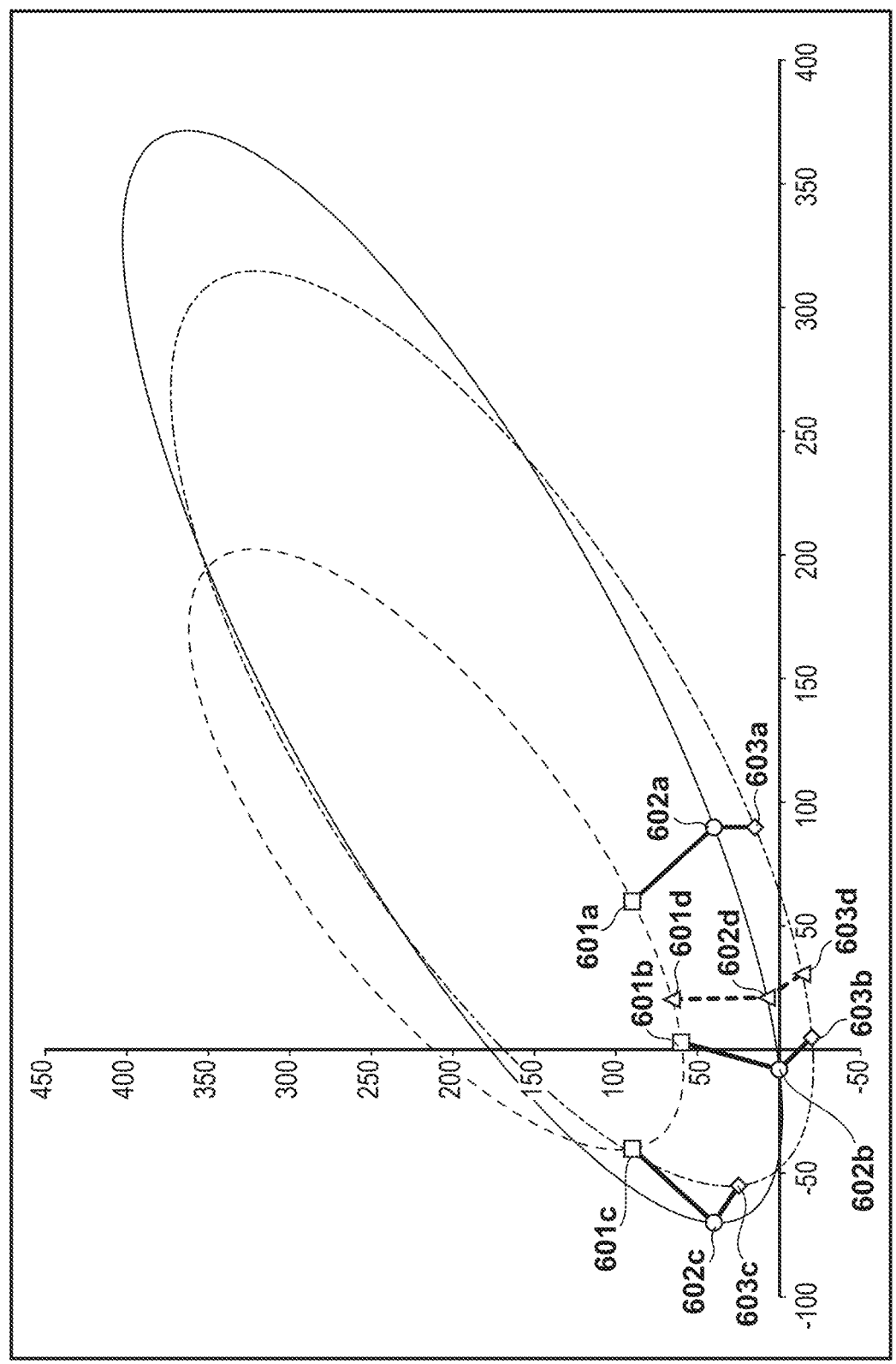

FIG. 9B

| | |
|---|---|
| VIEW DIRECTION 1 | —911 |
| APEX 1 | —912 |
| ARRANGEMENT COORDINATES 1 | —913 |
| APEX 2 | —912 |
| ARRANGEMENT COORDINATES 2 | —913 |
| ⋮ | |
| APEX N | —912 |
| ARRANGEMENT COORDINATES N | —913 |
| VIEW DIRECTION 2 | —911 |
| APEX 1 | —912 |
| ARRANGEMENT COORDINATES 1 | —913 |
| APEX 2 | —912 |
| ARRANGEMENT COORDINATES 2 | —913 |
| ⋮ | |
| APEX N | —912 |
| ARRANGEMENT COORDINATES N | —913 |
| VIEW DIRECTION 3 | —911 |
| APEX 1 | —912 |
| ARRANGEMENT COORDINATES 1 | —913 |
| APEX 2 | —912 |
| ARRANGEMENT COORDINATES 2 | —913 |
| ⋮ | |
| APEX N | —912 |
| ARRANGEMENT COORDINATES N | —913 |

F I G. 13A
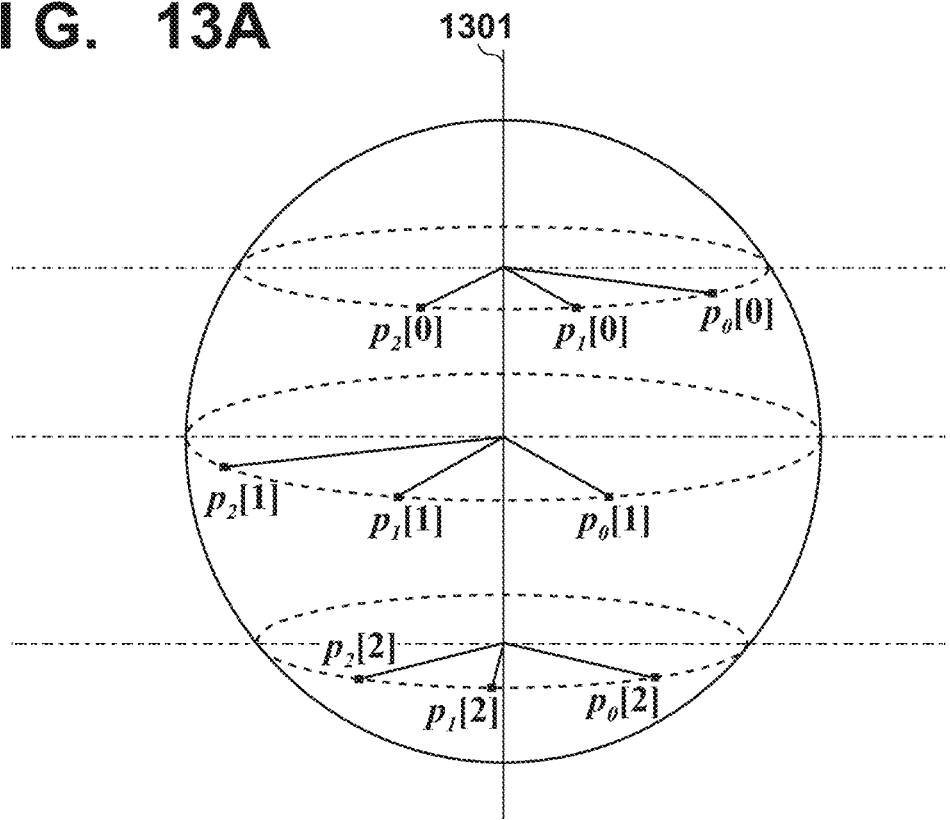
F I G. 13B
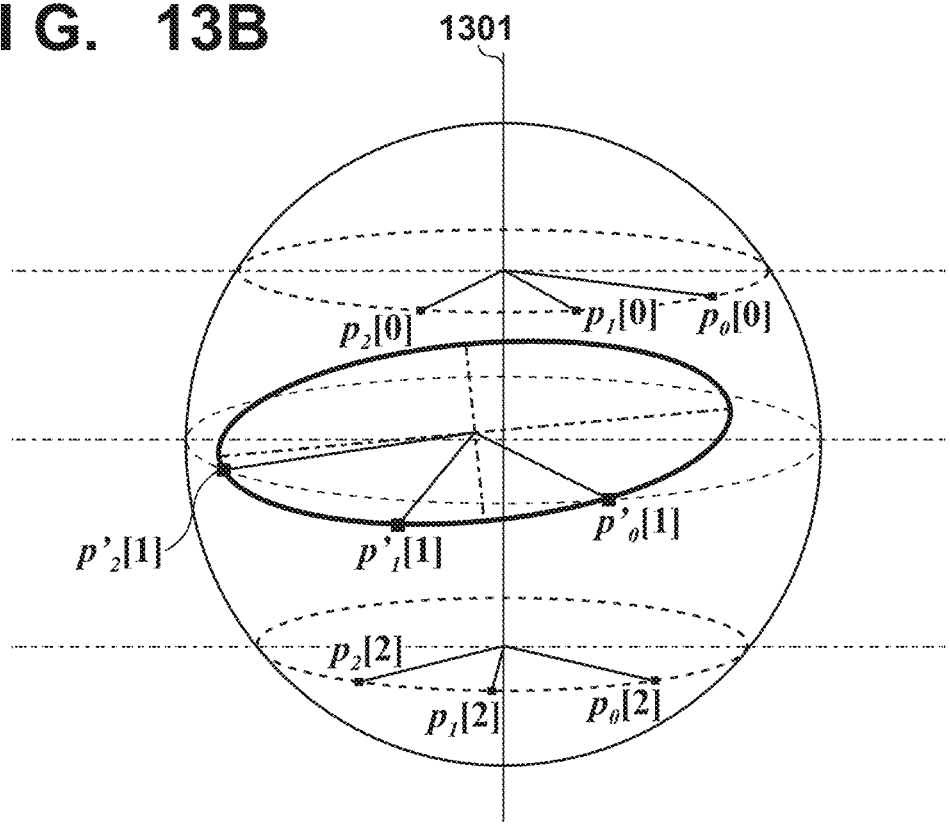

F I G. 15A
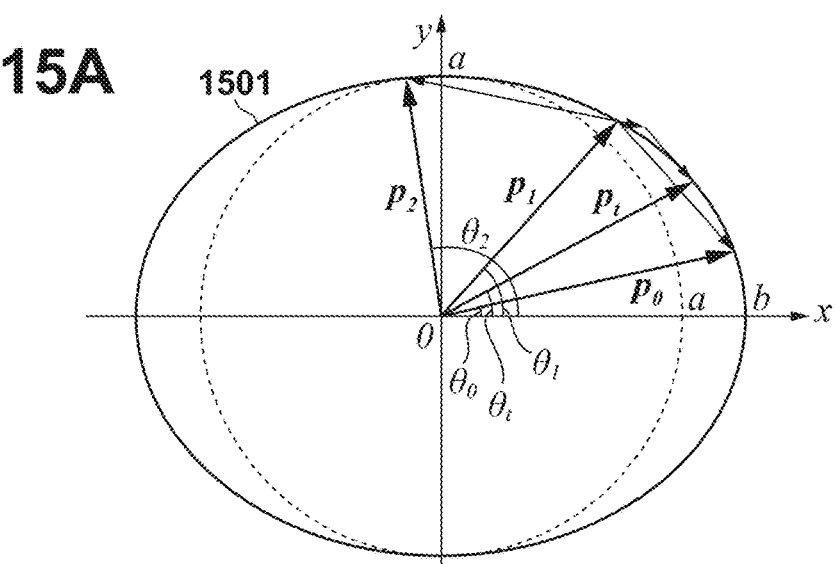
F I G. 15B
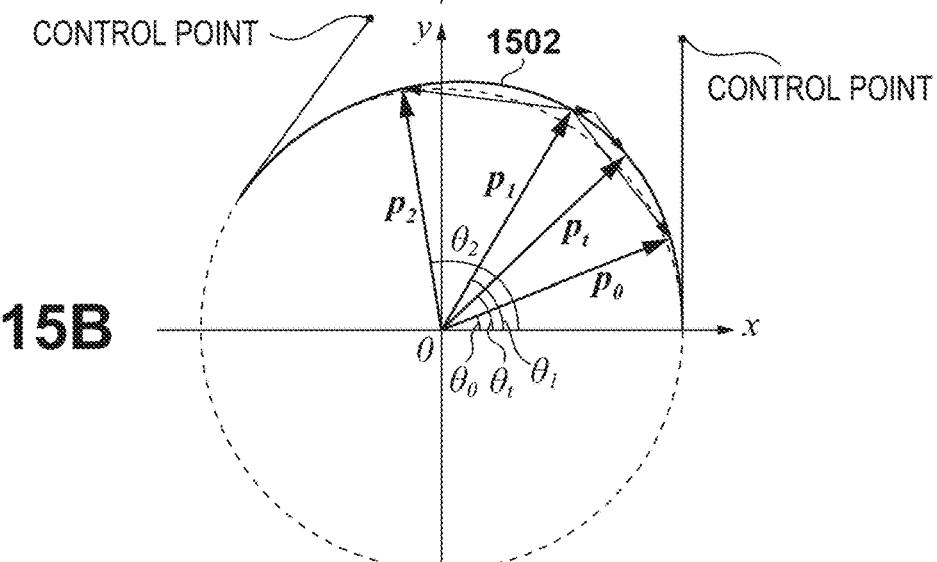
F I G. 15C
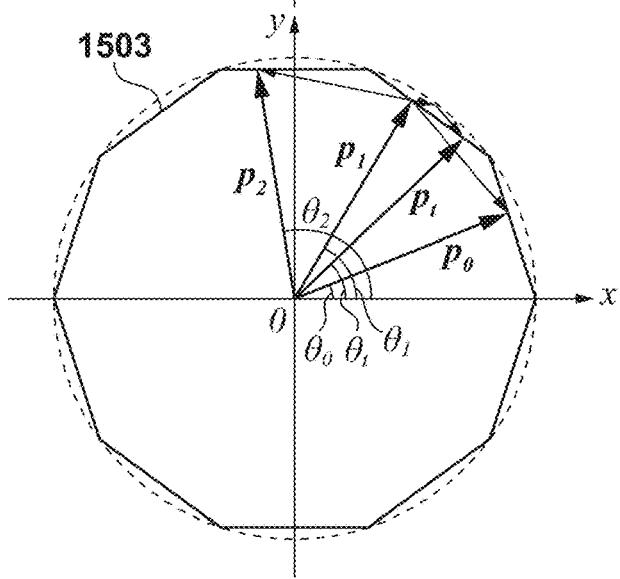

200~# RECORDING MEDIUM, INFORMATION PROCESSING APPARATUS, INFLUENCE DEGREE DERIVING METHOD, AND IMAGE GENERATION METHOD

This application is a continuation of International Patent Application No. PCT/JP2017/015902 filed on Apr. 20, 2017, and claims priority to Japanese Patent Application No. 2016-091536 filed on Apr. 28, 2016, the entire content of both of which is incorporated herein by reference.

TECHNICAL FIELD

The present invention relates to a recording medium, an information processing apparatus, an influence degree deriving method, and an image generation method and, more particularly, to a technique of performing three-dimensional rendering representation using a two-dimensional image.

BACKGROUND ART

Recently, in the technical field of computer graphics including electronic games, rendering representation using a three-dimensional model is the mainstream. This is because the time needed for processing such as repetitive rendering or lighting calculation can be reduced when, for example, rendering frames at a plurality of continuous points of time while moving the same character or background like an animation. In particular, for an interactive content like an electronic game that changes the behavior of a rendering object in real time in correspondence with a dynamic factor such as an operation input, when a three-dimensional model or animation data is prepared in advance, it is possible to easily generate rendering representation from various viewpoint positions or view directions or rendering representation corresponding to a posture change of a rendering object. Such a three-dimensional graphics is normally rendered by constructing a three-dimensional model based on a plurality of two-dimensional images (cuts) prepared by a designer or the like and applying a texture to the model.

On the other hand, the three-dimensional graphics rendered by such texture application may give an impression different from the initial cut prepared by the designer or the like. Since the three-dimensional graphics basically "correctly" renders the three-dimensional model to which the texture is applied for a specific viewpoint, it is difficult to reproduce the representation of effective "presentation" in a specific view direction, like a cut rendered as a two-dimensional image. For this reason, even a game content or the like which places emphasis on the attraction of representation unique to a two-dimensional image and mainly uses two-dimensional images in a game screen holds a predetermined support.

However, particularly in a case in which a continuous change is presented like an animation, the method of performing predetermined rendering representation using two-dimensional images needs to prepare a two-dimensional image corresponding to the state of each frame for each change element (part or the like). Hence, the working amount of the designer or the like and the data amount of images necessary for the rendering representation of the elements can be large, as compared to the three-dimensional graphics. For example, in an animation that renders a target object at standstill while moving on the outer periphery of the object, frames in which the target object is rendered from various angles (view directions) are sequentially reproduced. In the three-dimensional graphics, rendering is performed by defining, for each frame, a camera that has a corresponding visual line direction and moves around a three-dimensional model concerning the object. In this case, necessary data are the three-dimensional model data of the target object and a texture applied to the model. On the other hand, when generating such an animation without using three-dimensional graphics, two-dimensional images corresponding to the view directions of frames need to be prepared. For an animation of, for example, 60 fps, it is necessary to simply prepare the data of 60 types of two-dimensional images.

NPL 1 discloses a method of generating an intermediate frame (so-called in-betweening frame) from discrete frames (key frames) by morphing to reduce the working amount of a designer.

CITATION LIST

Non Patent Literature

NPL 1: Hiroaki Gohara, et al., "Cartoon Facial Animation with Minimal 2D Input Based on Non-linear Morphing", Proceedings 2 of the IEICE General Conference for Information/System, D-11-81, IEICE, 2010

Technical Problem

In NPL 1, to leave the representation unique to a two-dimensional image as described above, an angle concerning a view direction is set for two-dimensional images of different rendering representations, and two-dimensional images for a desired angle θ are generated. In the form disclosed in NPL 1, when generating an in-betweening image between two types of angles using two-dimensional images for the angles, a morphing parameter (blending ratio) that is nonlinear with respect to an angle is given to the parts of the right eye and the nose to change the rendering representations in the parts of a face, and blending ratio that is linear with respect to an angle is used for the remaining parts. More specifically, when deciding the nonlinear blending ratio, two types of angle thresholds are provided in advance, and the blending ratio is decided using a calculation method that changes between angle sections.

In the blending ratio deciding method disclosed in NPL 1, however, since the blending ratio is steeply changed between the threshold angles, as shown in FIG. 11, an animation that continuously changes the view direction may give a sense of incongruity to a viewer. In addition, a user input is necessary for threshold decision, the blending ratio calculation method, selection of parts to change the blending ratio, and the like. Hence, flexibility is not guaranteed, and it may be impossible to suitably reduce the working amount of the designer or the data amount of images necessary for generation of frames of an animation.

SUMMARY OF INVENTION

The present invention has been made in consideration of the above-described problem, and has as its object to provide a recording medium that suitably implements rotation representation of a viewpoint or an object using a two-dimensional image, an information processing apparatus, an influence degree deriving method, and an image generation method.

The present invention in its first aspect provides a non-transitory computer-readable recording medium recording a program for causing a computer to execute processing of deriving an influence degree to rendering representation for each of at least three types of view directions including a first view direction, a second view direction, and a third view direction when generating rendering representation of a target object concerning an output view direction based on the rendering representation of the target object defined for each of the at least three types of view directions, wherein the program causes the computer to execute: acquisition processing of acquiring information representing an angle concerning a view direction for each of the first view direction, the second view direction, and the third view direction and the output view direction; and deriving processing of deriving the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

The present invention in its second aspect provides an information processing apparatus for deriving an influence degree to rendering representation for each of at least three types of view directions including a first view direction, a second view direction, and a third view direction when generating rendering representation of a target object concerning an output view direction based on the rendering representation of the target object defined for each of the at least three types of view directions, comprising: an acquisition unit configured to acquire information representing an angle concerning a view direction for each of the first view direction, the second view direction, and the third view direction and the output view direction; and a deriving unit configured to derive the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

The present invention in its third aspect provides an influence degree deriving method of deriving an influence degree to rendering representation for each of at least three types of view directions including a first view direction, a second view direction, and a third view direction when generating rendering representation of a target object concerning an output view direction based on the rendering representation of the target object defined for each of the at least three types of view directions, comprising: an acquisition step of acquiring information representing an angle concerning a view direction for each of the first view direction, the second view direction, and the third view direction and the output view direction; and a deriving step of deriving the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

The present invention in its fourth aspect provides a non-transitory computer-readable recording medium recording a program for causing a computer to execute processing of generating an output image of rendering representation of a target object concerning an output view direction, wherein the program causes the computer to execute: decision processing of deciding the output view direction to generate the output image; and generation processing of generating the output image based on an influence degree derived by the influence degree deriving method and rendering representation concerning each of the first view direction, the second view direction, and the third view direction.

The present invention in its fifth aspect provides an information processing apparatus for generating an output image of rendering representation of a target object concerning an output view direction, comprising: a decision unit configured to decide the output view direction to generate the output image; and a generation unit configured to generate the output image based on the influence degree derived by an influence degree deriving method and rendering representation concerning each of the first view direction, the second view direction, and the third view direction.

The present invention in its sixth aspect provides an image generation method of generating an output image of rendering representation of a target object concerning an output view direction, comprising: a decision step of deciding the output view direction to generate the output image; and a generation step of generating the output image based on the influence degree derived by an influence degree deriving method and rendering representation concerning each of the first view direction, the second view direction, and the third view direction.

Advantageous Effects of Invention

With this arrangement, according to the present invention, it is possible to suitably implement rotation representation of a viewpoint or an object using a two-dimensional image.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 6A, 6B, 6C, and 6D are views showing arrangement coordinates derived in association with an output view direction according to the embodiment of the present invention;

FIGS. 9A and 9B are views showing examples of the structures of character data according to the embodiment of the present invention;

FIGS. 13A and 13B are views for explaining the orbit of arrangement coordinates according to a change in the output view direction in a three-dimensional computer graphics and in a case in which three-dimensional rendering representation is performed using a two-dimensional image according to the embodiment of the present invention;

FIGS. 15A, 15B, and 15C are views for explaining a weight deciding method according to the third embodiment of the present invention.

DESCRIPTION OF EMBODIMENTS

[First Embodiment]

An exemplary embodiment of the present invention will now be described in detail with reference to the accompanying drawings. Note that in an embodiment to be described below, an example in which the present invention is applied to a PC as an example of an information processing apparatus which deforms parts each formed by a two-dimensional image and generates an output image showing three-dimensional rendering representation concerning a predetermined character will be described. However, the present invention is applicable to an arbitrary device capable of presenting three-dimensional rotation representation by an output image generated by deforming parts not only for a character but also for an object formed by parts of two-dimensional images.

Figure 10A:
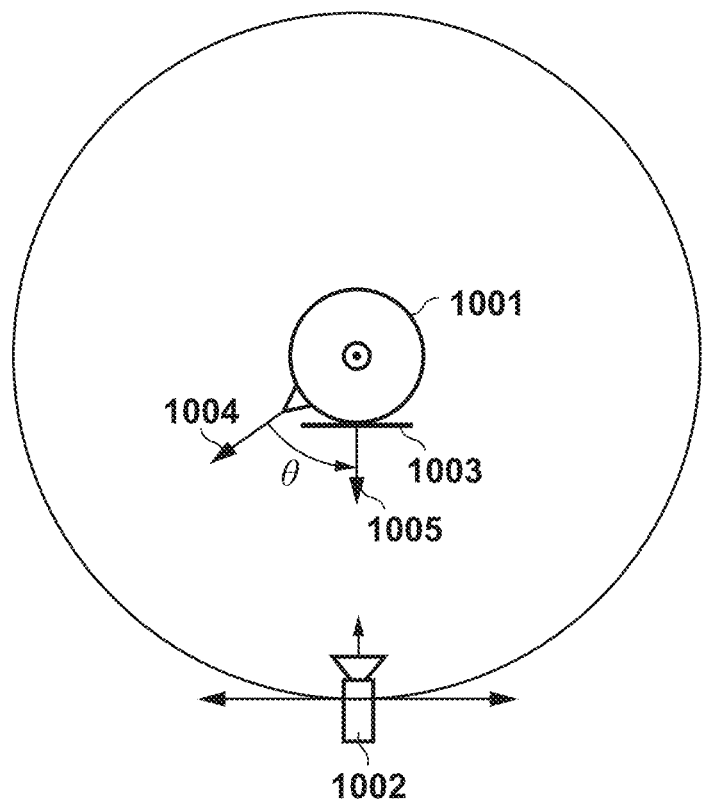
FIGS. 10A and 10B are views for explaining a view direction according to the present invention.
Figure 10B:
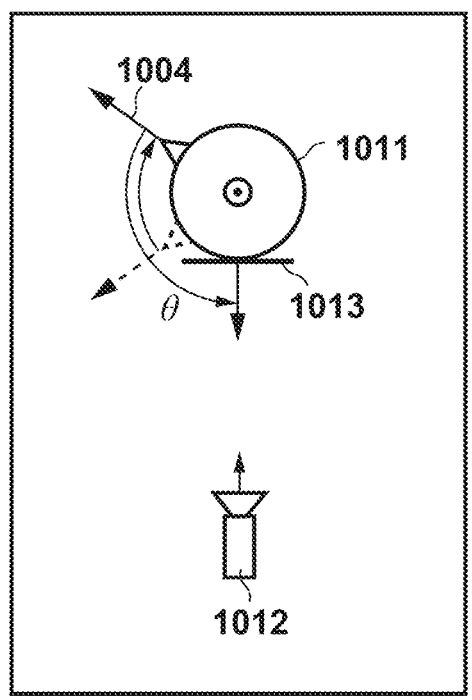
Figure 11:
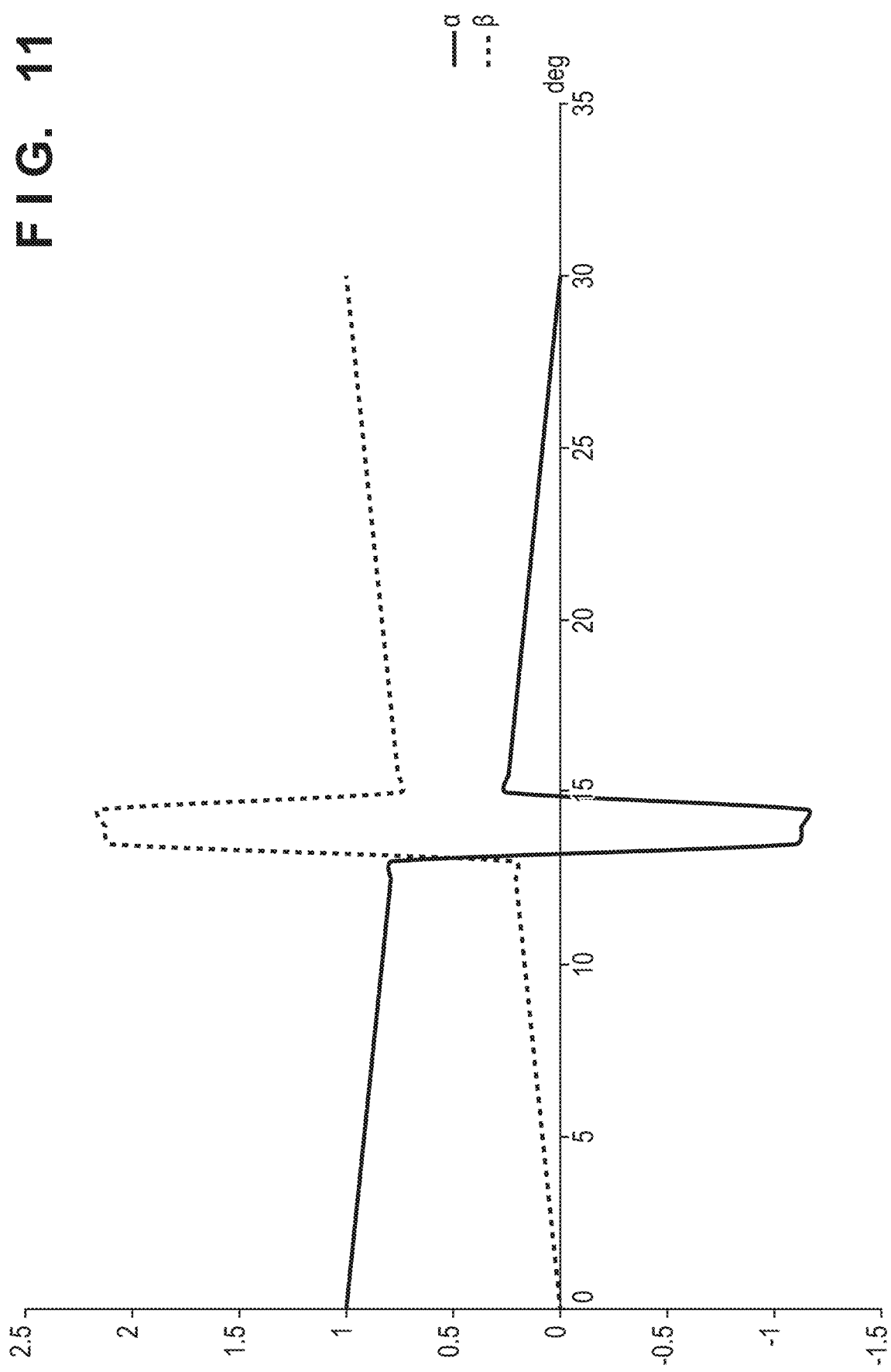
FIG. 11 is a view showing a blending ratio according to a prior art.

Note that in this specification, "view direction" is information that defines a plane of a target object represented by an output image when generating the output image of the target object showing three-dimensional rendering representation. That is, "view direction" is information determined based on the target object, which is represented by the relationship between a direction determined in advance as the reference direction (for example, the front direction) of the target object and a normal direction defined by the plane of the target object represented by the output image. For example, as shown in FIG. 10A, when defining a viewpoint 1002 that moves on the outer periphery of a target object 1001, a plane 1003 facing the viewpoint 1002 is determined, and a view direction is determined by an angle made by a reference direction 1004 for the target object 1001 and a normal 1005 of the plane 1003. In addition, as shown in FIG. 10B, even in a case in which a viewpoint 1012 does not move, and a target object 1011 rotates, since a plane 1013 facing the viewpoint 1012 changes, the view direction also changes accordingly. Hence, "view direction" in this specification is information determined based on the target object but is not always a concept determined by a visual line direction associated with a viewpoint as in a three-dimensional computer graphics.

<<Arrangement of PC 100>>

Figure 1:
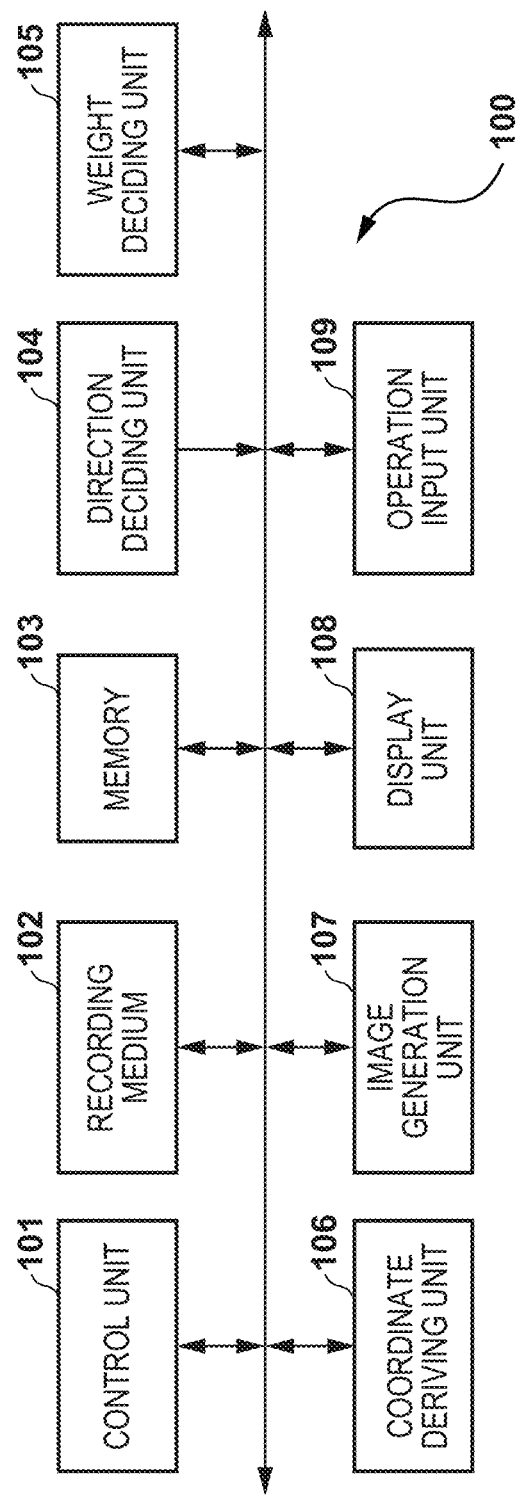
FIG. 1 is a block diagram showing the functional arrangement of a PC 100 according to an embodiment of the present invention.

FIG. 1 is a block diagram showing the functional arrangement of a PC 100 according to the embodiment of the present invention.

A control unit 101 is, for example, a control device such as a CPU and controls the action of each block provided in the PC 100. More specifically, the control unit 101 reads out a program concerning an operating system stored in a recording medium 102 or a program concerning a character view application to be described later, loads the program into a memory 103, and executes the program, thereby controlling the action of each block.

The recording medium 102 is, for example, a nonvolatile memory such as a rewriteable ROM or a storage device such as an HDD detachably connected to the PC 100. In addition, the recording medium 102 may include a recording medium such as a disk, for example, an optical drive in which a game program accessible via an interface capable of performing predetermined read/write is recorded. The recording medium 102 stores not only the above-described programs but also information such as parameters necessary for the action of each block and various kinds of data used to generate an image presenting three-dimensional rotation representation concerning a predetermined character.

<Character Data to Generate Image of Three-Dimensional Rendering Representation>

Figure 9A:
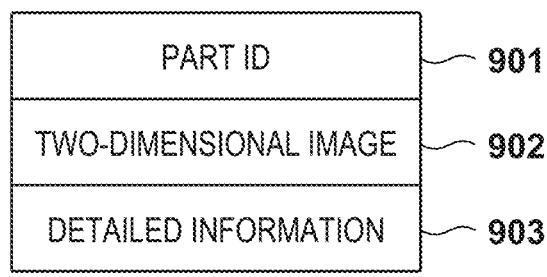

An example of the structure of character data used to generate an image concerning a predetermined character will be described here with reference to FIGS. 9A and 9B.

As described above, in the PC according to this embodiment, to generate an image of three-dimensional rendering representation concerning one character, the two-dimensional images of various parts (eyes, nose, mouth, forelock, and the like) of the character and the information of arrangement coordinates form one character data. As shown in FIG. 9A, for each of a plurality of parts necessary to represent a character, part information including a two-dimensional image 902 and detailed information 903 in association with a part ID 901 for identifying the part is managed in the character data. In this embodiment, for the sake of simplicity of the explanation, assume that the arrangement coordinates of the parts are independently decided at the time of image generation, and the character data has a data structure in which the parts are listed in parallel. However, a parent-child relationship may be defined between the parts such that, for example, child parts move synchronously based on the movement of one parent part, as a matter of course.

Figure 4:
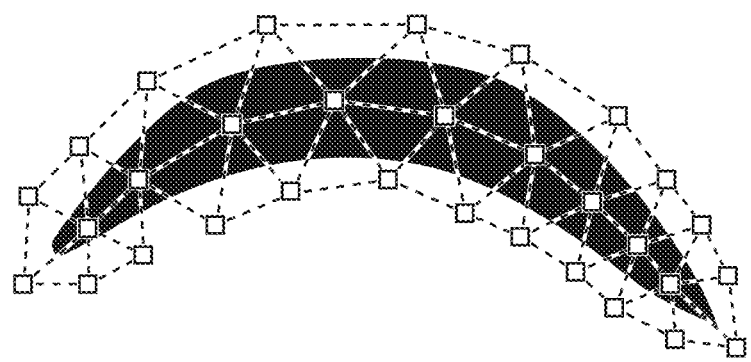
FIG. 4 is a view showing apexes defined for a part according to the embodiment of the present invention.
Figure 5A:
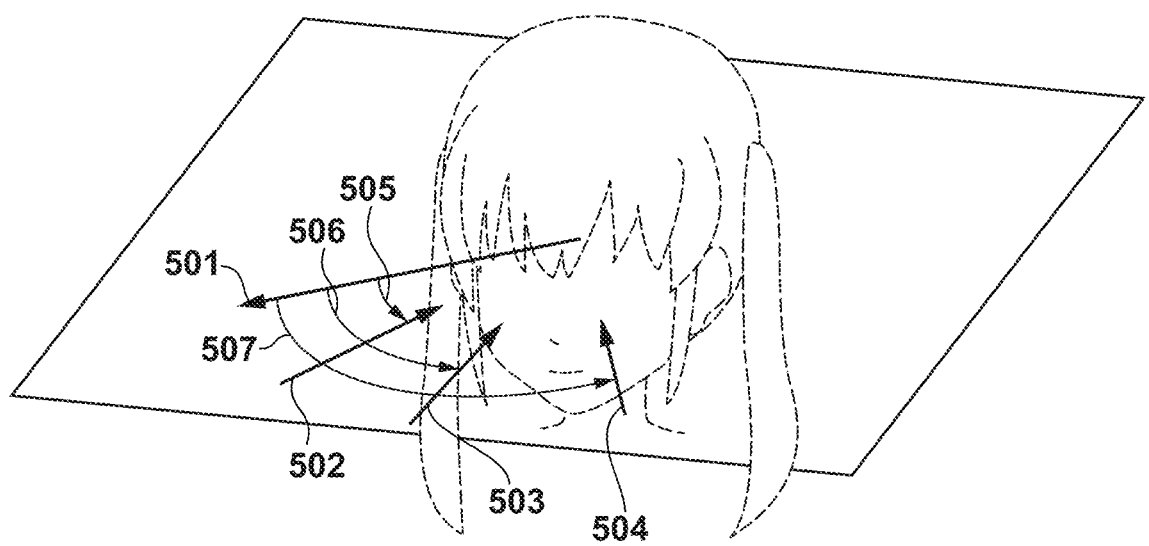
FIGS. 5A and 5B are views showing view directions and output images of a character defined for the respective directions according to the embodiment of the present invention.
Figure 5B:
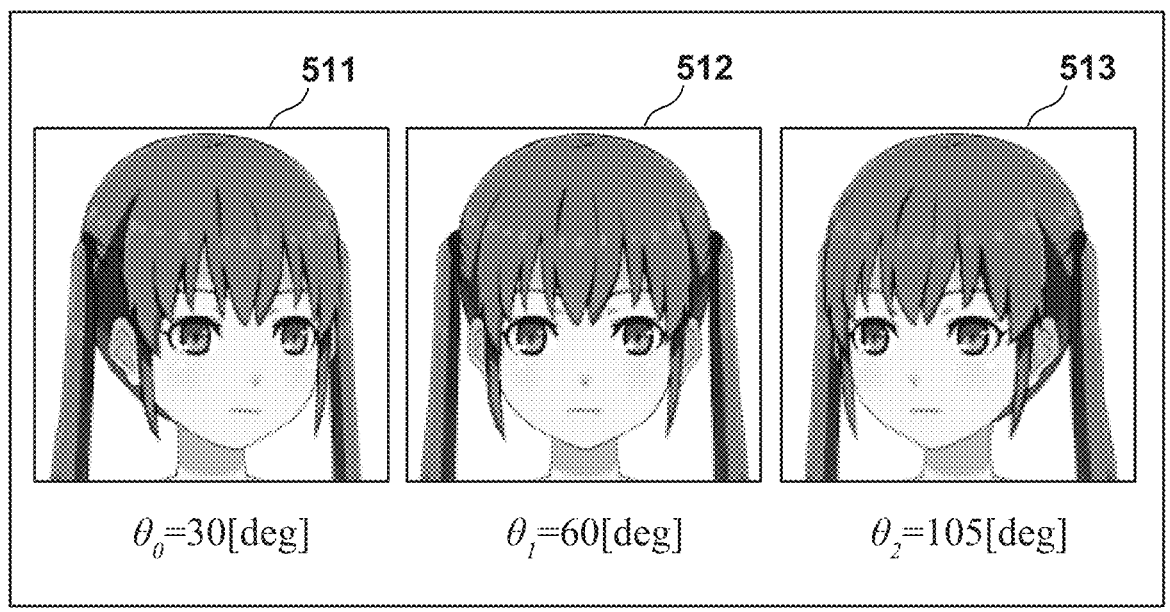

Additionally, in the detailed information 903 of each part, arrangement coordinates are determined for one or more apexes defined for the two-dimensional image of the part. The apexes defined for the two-dimensional image of a part are not limited to apexes that exist on the outer edge of the two-dimensional image or reference points such as anchor points and include apexes formed by dividing the two-dimensional image into polygons, as shown in FIG. 4. In this embodiment, for each part of the character, arrangement coordinates in output images corresponding to at least three different types of view directions (a first view direction, a second view direction, and a third view direction) are defined in advance. The three types of view directions are determined based on three vectors 502 to 504 defined in one virtual plane and directed to the character in a three-dimensional space virtually defined for the three-dimensional rendering representation of the character, as shown in FIG. 5A, and managed by angles 505 to 507 made by a vector 501 in the reference direction and the vectors (or the normal vectors of facing planes) (in FIG. 5A, $\theta_0=30°$ (angle 505), $\theta_1=60°$ (angle 506), and $\theta_2=105°$ (angle 507)). Hence, the detailed information 903 is managed by associating the information of an apex 912 and arrangement coordinates 913 of a part for each view direction 911, as shown in FIG. 9B. For example, as shown in FIG. 5B, the detailed information is defined such that output images 511, 512, and 513 of the character are obtained for the view directions indicated by the angles 505 to 507.

Additionally, in this embodiment, the description will be made assuming that the two-dimensional images of the parts are used to represent the character. However, the application of the present invention is not limited to this. That is, to generate an image concerning a character, not only a configuration that deforms and arranges the two-dimensional images provided for parts but also a configuration that arranges a line segment or two-dimensional shape that can be formed based on a predetermined rule by holding the values of the coordinates of specific points like a Bezier curve formed by vector data including anchor points or control points may be used. In this case, the coordinates of not the apexes but the specific points are defined for the at least three different types of view directions described above.

The memory 103 may be, for example, a volatile memory such as a RAM. The memory 103 is used not only as a loading area to load a program and the like read out from the recording medium 102 but also as a storage area to store intermediate data and the like output in the action of each block.

A direction deciding unit 104 decides the view direction (output view direction) to generate an output image in the character view application to be described later. For example, for the purpose of editing, confirmation, or the like, the output view direction may be decided based on a specific (absolute or relative) angle input by the user. Additionally, for the purpose of animation reproduction or the like, the output view direction may be decided based on an angle sequentially decided for a frame by a predetermined calculation.

A weight deciding unit 105 decides a weight used to generate the output image of the character associated with the output view direction decided by the direction deciding unit 104. In the PC 100 according to this embodiment, to generate the output image of the character associated with the output view direction, the arrangement coordinates of the apexes of the parts in the output image are decided by performing weighted addition of the arrangement coordinates of the corresponding apexes, which are already defined for the three types of view directions (the first view direction, the second view direction, and the third view direction) determined in advance. Hence, the weight deciding unit 105 decides the weight associated with each view direction used in the weighted addition. Details of the weight deciding method will be described later A coordinate deriving unit 106 performs weighted addition calculation based on the weight decided by the weight deciding unit 105 and, when generating the output image of the character associated with the output view direction, derives coordinates to arrange the apexes of each part. In the present invention, a weight decided for one output view direction can be used for the apexes of all parts provided for the character. In addition, the weight according to the present invention is a value decided by an angle concerning the output view direction and each of the three types of view directions determined in advance, as will be described later. For this reason, the weight calculated once is stored in, for example, the memory 103 in association with the output view direction. If the same output view direction is selected again, the weight deciding unit 105 does not perform the calculation concerning weight decision, and the coordinate deriving unit 106 acquires the corresponding weight from the memory 103 and performs the weighted addition calculation.

An image generation unit 107 can be, for example, a rendering device such as a GPU and controls generation and updating of an image displayed in the display area of a display unit 108. In this embodiment, based on the deriving result of the coordinate deriving unit 106, the image generation unit 107 deforms the two-dimensional images of the parts provided for the character and arranges them such that the apexes are located at the derived positions, thereby generating the output image associated with the output view direction.

The display unit 108 may be, for example, a display device such as an LCD. In this embodiment, the description will be made assuming that the display unit 108 is a constituent element included in the PC 100. However, the implementation of the present invention is not limited to this. The display unit 108 need not be a device using the same housing as the PC 100, and may be an external display device detachably attached to the PC 100.

An operation input unit 109 is, for example, a user interface such as a mouse, a keyboard, or a pen tablet provided on the PC 100. Upon detecting an operation input made by various kinds of interfaces, the operation input unit 109 outputs a control signal corresponding to the operation input to the control unit 101. In addition, the operation input unit 109 notifies the control unit 101 of the occurrence of an event corresponding to the operation input.

<<Weight Deciding Method>>

A weight deciding method used by the weight deciding unit 105 according to this embodiment will be described below with reference to FIG. 2.

Figure 2:
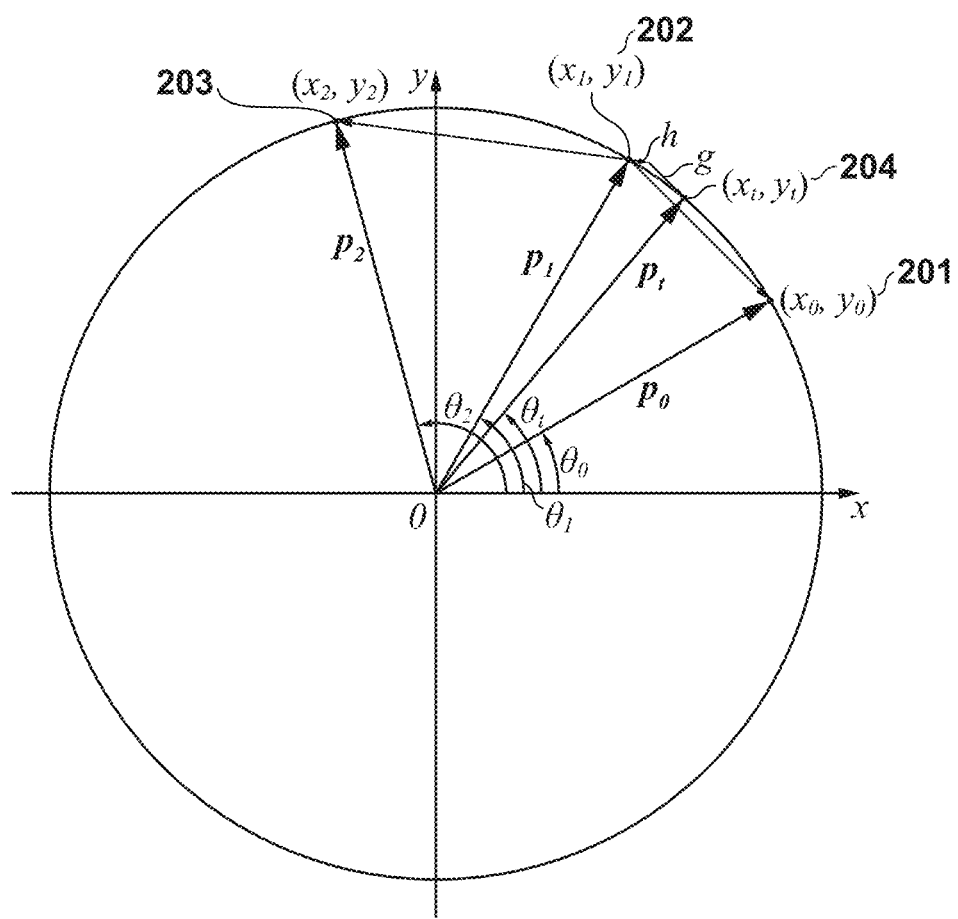
FIG. 2 is a view for explaining a weight deciding method according to the first embodiment of the present invention.

FIG. 2 shows a unit circle with its center at the origin, and $p_0$, $p_1$, and $p_2$ are vectors (starting at the origin) indicating points 201, 202, and 203 on the circumference corresponding to the first view direction, the second view direction, and the third view direction. Since the view directions are defined by the angles made with the reference direction determined for the character, as described above, the points 201, 202, and 203 corresponding to the view directions in FIG. 2 are defined as the coordinates of radius vector 1 using the angles ($\theta_0$, $\theta_1$, and $\theta_2$) that define the view directions as the angles of deviation from the X-axis.

At this time, let $p_t$ (radius vector 1, angle $\theta_t$ of deviation) be a vector indicating a point 204 corresponding to the output view direction. The vector can be expressed, using $p_0$, $p_1$, and $p_2$, as $$p_t = p_1 + g(p_0 - p_1) + h(p_2 - p_1) \qquad (1)$$

$$\begin{pmatrix} x_t \\ y_t \end{pmatrix} = \begin{pmatrix} x_1 \\ y_1 \end{pmatrix} + g\begin{pmatrix} x_0 - x_1 \\ y_0 - y_1 \end{pmatrix} + h\begin{pmatrix} x_2 - x_1 \\ y_2 - y_1 \end{pmatrix} \qquad (2)$$

$$\begin{pmatrix} \cos\theta_t \\ \sin\theta_t \end{pmatrix} = \begin{pmatrix} \cos\theta_1 \\ \sin\theta_1 \end{pmatrix} + g\begin{pmatrix} \cos\theta_0 - \cos\theta_1 \\ \sin\theta_0 - \sin\theta_1 \end{pmatrix} + h\begin{pmatrix} \cos\theta_2 - \cos\theta_1 \\ \sin\theta_2 - \sin\theta_1 \end{pmatrix}$$

where g and h can be expressed, by modifying equation (2), as a determinant given by $$\begin{bmatrix} \cos\theta_0 - \cos\theta_1 & \cos\theta_2 - \cos\theta_1 \\ \sin\theta_0 - \sin\theta_1 & \sin\theta_2 - \sin\theta_1 \end{bmatrix} \begin{bmatrix} g \\ h \end{bmatrix} = \begin{bmatrix} \cos\theta_t - \cos\theta_1 \\ \sin\theta_t - \sin\theta_1 \end{bmatrix}$$

Hence, when the determinant is solved using the addition theorem of a trigonometric function, we obtain $$\begin{bmatrix} 1 & 0 \\ 0 & 1 \end{bmatrix} \begin{bmatrix} g \\ h \end{bmatrix} = \begin{bmatrix} \frac{(\sin\theta_2 - \sin\theta_1)(\cos\theta_t - \cos\theta) - (\cos\theta_2 - \cos\theta_1)(\sin\theta_t - \sin\theta_1)}{(\cos\theta_0 - \cos\theta_1)(\sin\theta_2 - \sin\theta_1) - (\cos\theta_2 - \cos\theta_1)(\sin\theta_0 - \sin\theta_1)} \\ \frac{(\cos\theta_0 - \cos\theta_1)(\sin\theta_t - \sin\theta_1) - (\sin\theta_0 - \sin\theta_1)(\cos\theta_t - \cos\theta)}{(\cos\theta_0 - \cos\theta_1)(\sin\theta_2 - \sin\theta_1) - (\cos\theta_2 - \cos\theta_1)(\sin\theta_0 - \sin\theta_1)} \end{bmatrix}$$

$$= \begin{bmatrix} \frac{(\sin\theta_1\cos\theta_2 - \cos\theta_1\sin\theta_2) + (\sin\theta_t\cos\theta_0 - \cos\theta_t\sin\theta_0) + (\sin\theta_2\cos\theta_t - \cos\theta_2\sin\theta_t)}{(\sin\theta_0\cos\theta_1 - \cos\theta_0\sin\theta_1) + (\sin\theta_1\cos\theta_2 - \cos\theta_1\sin\theta_2) + (\sin\theta_2\cos\theta_0 - \cos\theta_2\sin\theta_0)} \\ \frac{(\sin\theta_0\cos\theta_1 - \cos\theta_0\sin\theta_1) + (\sin\theta_t\cos\theta_0 - \cos\theta_t\sin\theta_0) + (\sin\theta_1\cos\theta_t - \cos\theta_1\sin\theta_t)}{(\sin\theta_0\cos\theta_1 - \cos\theta_0\sin\theta_1) + (\sin\theta_1\cos\theta_2 - \cos\theta_1\sin\theta_2) + (\sin\theta_2\cos\theta_0 - \cos\theta_2\sin\theta_0)} \end{bmatrix}$$

$$= \begin{bmatrix} \frac{\sin(\theta_1 - \theta_2) + \sin(\theta_t - \theta_0) + \sin(\theta_2 - \theta_t)}{\sin(\theta_0 - \theta_1) + \sin(\theta_1 - \theta_2) + \sin(\theta_2 - \theta_0)} \\ \frac{\sin(\theta_0 - \theta_1) + \sin(\theta_t - \theta_0) + \sin(\theta_1 - \theta_t)}{\sin(\theta_0 - \theta_1) + \sin(\theta_1 - \theta_2) + \sin(\theta_2 - \theta_0)} \end{bmatrix}$$

On the other hand, when equation (1) is modified, we obtain $$p_t = u p_0 + v p_1 + w p_2$$

$$\therefore u = g, v = 1 - g - h, w = h$$

$p_t$ corresponding to the output view direction can be expressed as an equation of weighted addition using $p_0$, $p_1$, and $p_2$ and weights u, v, and w corresponding to them.

Hence, since $$v = \frac{\sin(\theta_2 - \theta_0) - \sin(\theta_t - \theta_0) - \sin(\theta_t - \theta_1) - \sin(\theta_1 - \theta_t) - \sin(\theta_2 - \theta_t)}{\sin(\theta_0 - \theta_1) + \sin(\theta_1 - \theta_2) + \sin(\theta_2 - \theta_0)}$$

$$= \frac{\sin(\theta_2 - \theta_0) + \sin(\theta_0 - \theta_t) + \sin(\theta_1 - \theta_t) - \sin(\theta_1 - \theta_t) + \sin(\theta_t - \theta_2)}{\sin(\theta_0 - \theta_1) + \sin(\theta_1 - \theta_2) + \sin(\theta_2 - \theta_0)}$$

$$= \frac{\sin(\theta_2 - \theta_0) + \sin(\theta_0 - \theta_t) + \sin(\theta_t - \theta_2)}{\sin(\theta_0 - \theta_1) + \sin(\theta_1 - \theta_2) + \sin(\theta_2 - \theta_0)}$$

the weights associated with the first view direction, the second view direction, and the third view direction can be obtained as $$\begin{cases} u = \frac{\sin(\theta_1 - \theta_2) + \sin(\theta_t - \theta_0) + \sin(\theta_2 - \theta_t)}{\sin(\theta_0 - \theta_1) + \sin(\theta_1 - \theta_2) + \sin(\theta_2 - \theta_0)} \\ v = \frac{\sin(\theta_2 - \theta_0) + \sin(\theta_0 - \theta_t) + \sin(\theta_t - \theta_2)}{\sin(\theta_0 - \theta_1) + \sin(\theta_1 - \theta_2) + \sin(\theta_2 - \theta_0)} \\ w = \frac{\sin(\theta_0 - \theta_1) + \sin(\theta_t - \theta_0) + \sin(\theta_1 - \theta_t)}{\sin(\theta_0 - \theta_1) + \sin(\theta_1 - \theta_2) + \sin(\theta_2 - \theta_0)} \end{cases} \quad (3)$$

The weights obtained here represent the ratio of view direction components when acquiring information corresponding to the output view direction using information corresponding to the first view direction, the second view direction, and the third view direction. In other words, this is equivalent to representing the influence degree of each view direction component when obtaining the rendering representation of the character for an arbitrary output view direction after the rendering representations of the character for the first view direction, the second view direction, and the third view direction are defined.

Hence, when a vector representing the arrangement coordinates of an ith apex in the parts forming the character is represented by q[i], arrangement coordinates $q_t[i]$ of the apex in the output image can be expressed, using arrangement coordinates $q_0[i]$ of a corresponding apex defined for the first view direction, arrangement coordinates $q_1[i]$ of a corresponding apex defined for the second view direction, and arrangement coordinates $q_2[i]$ of a corresponding apex defined for the third view direction, as $$q_t[i] = u q_0[i] + v q_1[i] + w q_2[i]$$

As is apparent from equations (3), a common weight can be used independently of a part or apex. For this reason, the coordinate deriving unit 106 can perform the weighted addition calculation for all apexes using the weight decided for the output view direction and derive the arrangement coordinates.

<<Image Generation Processing>>

Figure 3:
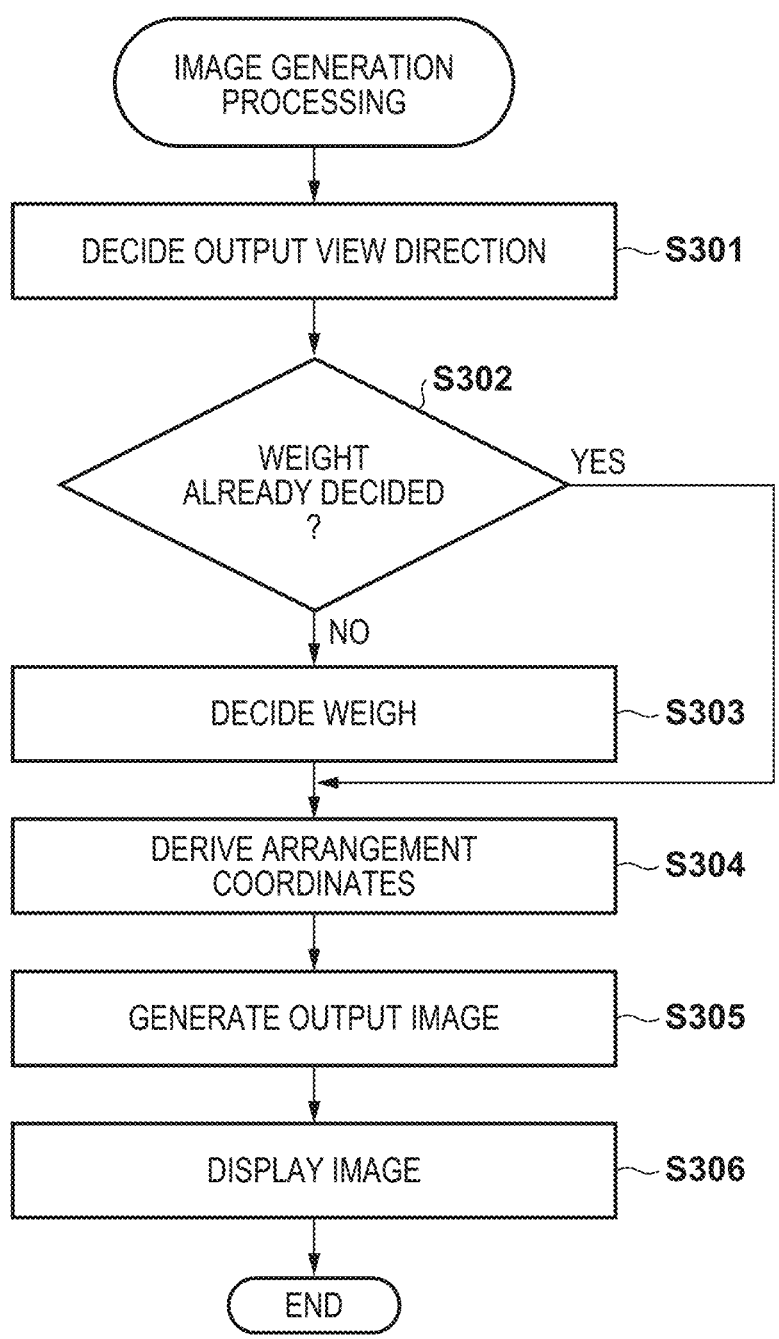
FIG. 3 is a flowchart showing image generation processing executed by the PC 100 according to the embodiment of the present invention.

As for image generation processing of generating the output image of the character associated with the output view direction, which is executed by the PC 100 according to this embodiment with this arrangement, detailed processing will be described with reference to the flowchart of FIG. 3. Processing corresponding to the flowchart can be implemented when the control unit 101 reads out a corresponding processing program stored in, for example, the recording medium 102, loads the program into the memory 103, and executes the program. Note that the description will be made assuming that the image generation processing is started, for example, when an operation input associated with a change in the view direction is done after execution of the character view application. Additionally, in this embodiment, since image generation processing in the form of the character view application will be described, the arrangement coordinates of each apex of the parts concerning the character are assumed to be set in advance for each of the first view direction, the second view direction, and the third view direction. However, the implementation of the present invention is not limited to this form. For example, the present invention is also applicable when displaying an output image of the character associated with an undefined view direction (output view direction) in an application capable of defining the part arrangement of the character for discrete view directions such as the first view direction, the second view direction, and the third view direction.

In step S301, under the control of the control unit 101, the direction deciding unit 104 decides the output view direction based on a perform operation input.

In step S302, the control unit 101 determines whether the weight for each of the first view direction, the second view direction, and the third view direction is already decided concerning the decided output view direction. As described above, the determination of this step may be done by, for example, determining whether the information of the weight associated with the corresponding output view direction is stored in the memory 103. Upon determining that the weights are already decided concerning the output view direction, the control unit 101 advances the process to step S304. Upon determining that the weights are not decided yet, the control unit 101 advances the process to step S303.

In step S303, under the control of the control unit 101, the weight deciding unit 105 decides the weights (u, v, and w) for the first view direction, the second view direction, and the third view direction concerning the output view direction. The weight deciding unit 105 stores the information of the decided weights in the memory 103 in association with the output view direction.

In step S304, under the control of the control unit 101, the coordinate deriving unit 106 derives arrangement coordinates concerning the output view direction for each apex of the parts of the character. More specifically, the coordinate deriving unit 106 reads out the weight stored in the memory 103 in association with the output view direction, and performs weighted addition of the arrangement coordinates of corresponding apexes determined for the first view direction, the second view direction, and the third view direction, thereby deriving the arrangement coordinates concerning the output view direction.

In step S305, under the control of the control unit 101, the image generation unit 107 arranges the apexes of the parts of the character based on the deriving result of the coordinate deriving unit 106 and generates the output image of the character concerning the output view direction. Arranging the apexes may include various kinds of image conversion processing in the polygon of each part.

In step S306, the image generation unit 107 transmits the generated output image to the display unit 108 to display the output image, and completes the image generation processing.

As described above, according to the image generation processing of this embodiment, it is possible to suitably implement rotation representation of a viewpoint or an object using a two-dimensional image. More specifically, when the arrangement of the parts of the rendering object is defined for each of the angles corresponding to the three types of view directions, and images to be presented for the view directions are formed, the arrangement positions of the parts in another view direction can be derived not by linear interpolation but in consideration of the three-dimensional rotation of the rendering object based on the defined angles.

Note that in this embodiment, the description has been made assuming that if the weight concerning the desired output view direction is not stored yet in step S302, the weight concerning the output view direction is calculated based on the angles associated with the first view direction, the second view direction, and the third view direction. However, the implementation of the present invention is not limited to this. For example, when the angles concerning the first view direction, the second view direction, and the third view direction are given as inputs, a weight may be calculated in advance for each of view directions associated with discretely defined angles other than these angles and stored in a data structure such as a table. In this case, when an output view direction associated with a defined angle is set, the weight stored in the table is used. When an output view direction associated with an angle other than the defined angles is set, a weight obtained by performing linear interpolation for weights associated with a plurality of types of view directions, which are determined for angles close to the angle and stored in the table, is used. That is, the configuration that calculates the weight for the desired output view direction is preferably used. However, a configuration that calculates the weight for the desired output view direction by a simple calculation based on weights calculated in advance for view directions of several patterns may be used.

Figure 6A:
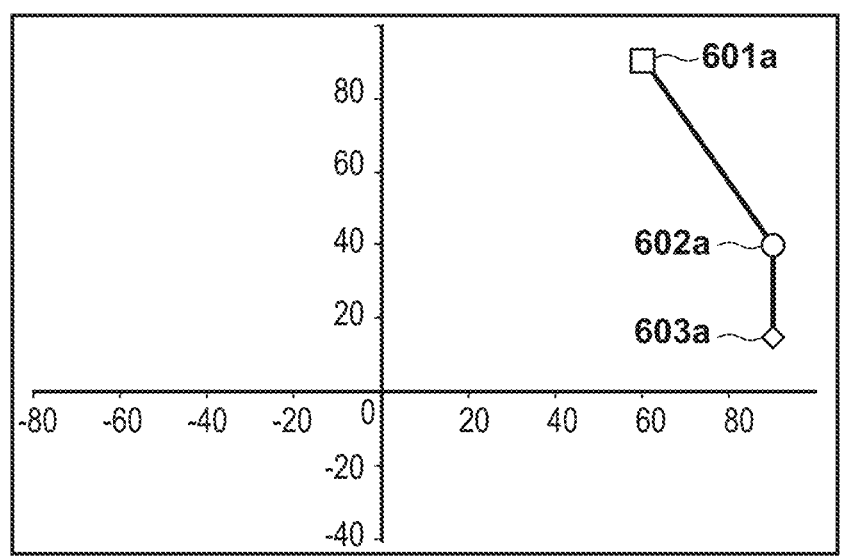
Figure 6B:
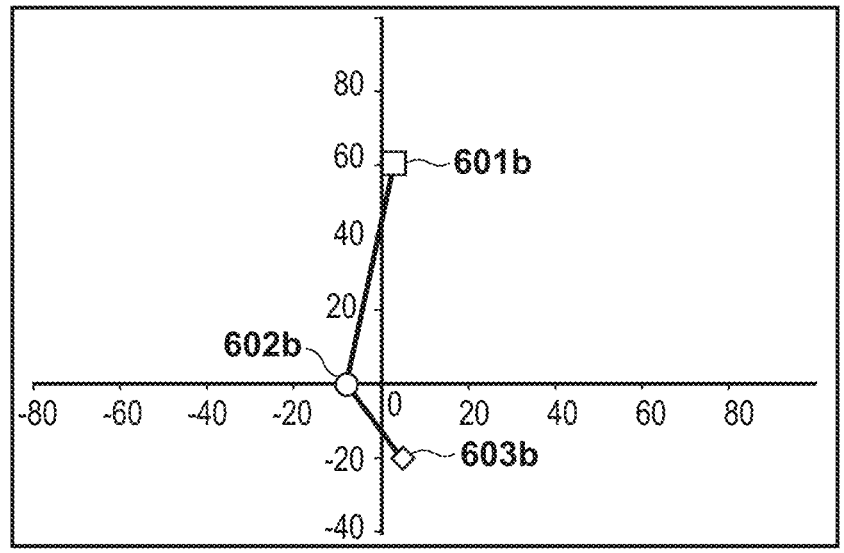
Figure 6C:
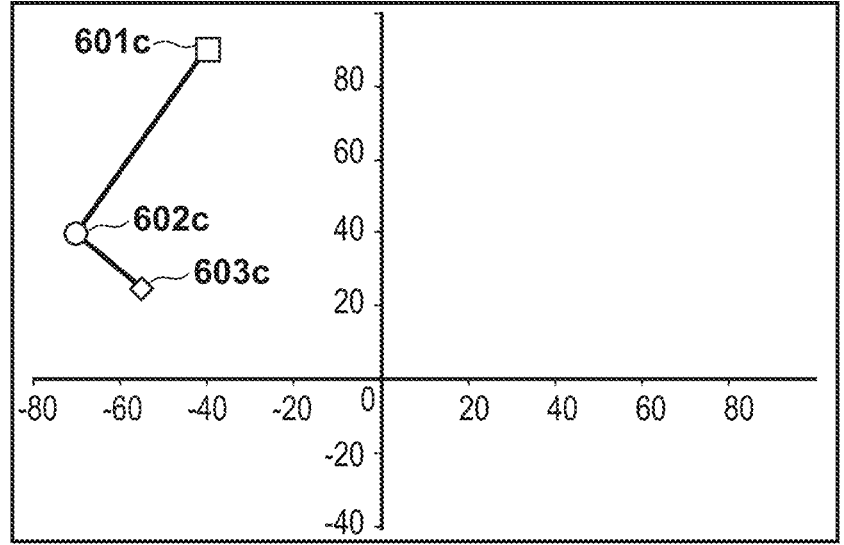

In addition, according to the above-described method, the arrangement coordinates derived in association with the output view direction for an arbitrary apex are decided on an elliptic orbit passing through the arrangement coordinates defined for the apex in association with the first view direction, the second view direction, and the third view direction. For example, a rendering object formed by apexes 601 (a to c), 602 (a to c), and 603 (a to c) whose arrangement coordinates in a view direction (first view direction) of 30°, a view direction (second view direction) of 60°, and a view direction (third view direction) of 105° are defined, as shown in FIGS. 6A, 6B, and 6C, will be examined. At this time, when the view directions are changed within the range of 0° to 360°, the arrangement coordinates derived for the apexes draw elliptic orbits, as shown in FIG. 6D. FIG. 6D shows apexes 601*d*, 602*d*, and 603*d* obtained when the output view direction is decided to 50°. As shown in FIG. 6D, although the elliptic orbits obtained for the apexes have different centers and different major axis angles, the relative relationship of angles in the view directions is maintained on each orbit. That is, the apexes are arranged at coordinates corresponding to the angles in an order of 30°→50°→60°→105° (in an order of a→d→b→c) clockwise on each orbit.

In other words, generically speaking, using the vectors $p_0$, $p_1$, and $p_2$ shown in FIG. 2 in correspondence with the first view direction, the second view direction, and the third view direction, direction vectors $v_0$ and $v_2$ used to represent the vector $p_t$ concerning the point 204 corresponding to the output view direction can be expressed as $$v_0 = p_0 - p_1$$

$$v_2 = p_2 - p_1$$

On the other hand, in the rendering representation of the character associated with each of the first view direction, the second view direction, and the third view direction, when the coordinates of one associated apex (one apex defined for the two-dimensional image of an arbitrary part) are represented by vectors $p_0'$, $p_1'$, and $p_2'$, direction vectors $v_0'$ and $v_2'$ representing the relationship between them can also be expressed as $$v_0' = p_0' - p_1'$$

$$v_2' = p_2' - p_1'$$

Here, when a 2×2 transformation matrix M representing the relationship between the points 201 to 203 in the unit circle concerning the weight decision and three coordinates of the same apex in the rendering representation of the character in the first view direction, the second view direction, and the third view direction is defined, we obtain $$\begin{cases} v_1' = Mv_1 \\ v_2' = Mv_2 \end{cases}$$

Matrices having the components as elements can be obtained by $$V' = M \cdot V$$

$$\because V = \begin{bmatrix} v_{0x} & v_{2x} \\ v_{0y} & v_{2y} \end{bmatrix}, V' = \begin{bmatrix} v'_{0x} & v'_{2x} \\ v'_{0y} & v'_{2y} \end{bmatrix}$$

If the components are known, the transformation matrix M is uniquely determined by $$M = V' \cdot V^{-1}$$

Hence, in the unit circle concerning the weight decision, equation (1) can be modified into $$v_t = p_t - p_1 = gv_0 + hv_2$$

As for the three coordinates of the same apex in the rendering representation of the character in the first view direction, the second view direction, and the third view direction as well, when the vector is expressed as $$v'_t = p'_t - p'_1 = gv'_0 + hv'_2$$

we obtain, using the transformation matrix M, $$\begin{aligned} v'_t &= gMv_0 + hMv_2 \\ &= M(gv_0 + hv_2) \\ &= Mv_t \end{aligned}$$

Figure 12:
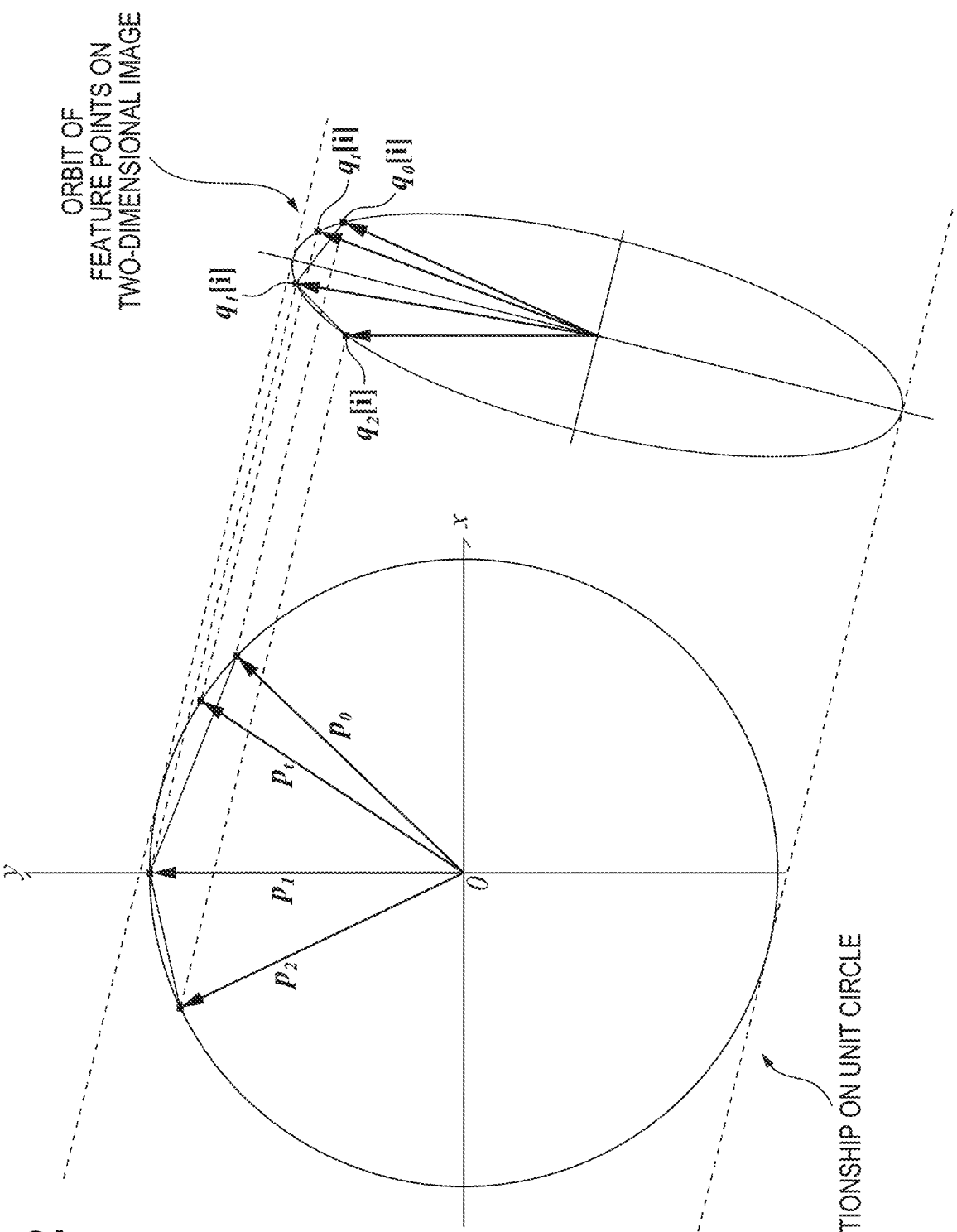
FIG. 12 is a view for explaining a circular orbit associated with weight decision, and a changed orbit of arrangement coordinates according to a change in the output view direction in an output image according to the embodiment of the present invention.

Here, the transformation implemented by the 2×2 transformation matrix is linear transformation concerning rotation, scaling, shear, or composition of at least some of them. Hence, $v_t'$ obtained by multiplying $V_t$ using the circumference of the unit circle as the orbit by such a transformation matrix draws an ellipse (or perfect circle) formed by transforming the unit circle by rotation, scaling, shear, or composition of at least some of them. That is, even when the rendering representation of the character is defined for the first view direction, the second view direction, and the third view direction without intending three-dimensional rotation representation, for each apex of a corresponding part in the rotation representation of the character, the arrangement coordinates of the apex in an arbitrary output view direction can be decided to draw an elliptical orbit. In addition, as shown in FIG. 12, since the relative relationship of the points corresponding to the angles concerning the view directions implemented on the unit circle is maintained even on the elliptical orbit, as a matter of course, it is possible to present the three-dimensional rendering representation of the character that correctly represents the rotational movement in the view directions.

Additionally, when the coordinates defined for the first view direction, the second view direction, and the third view direction in association with a specific point exist on a straight line, the transformation matrix for the coordinates is expressed as a composed matrix given by $$M = M_1 \cdot \begin{bmatrix} 1 & 0 \\ 0 & 0 \end{bmatrix} \cdot M_2$$

In this case, the movement of the apexes according to a change in the output view direction draws an orbit that maps the movement on the ellipse corresponding to the view direction onto a straight line, as a matter of course.

In summary, when the arrangement coordinates associated with the output view direction are derived using this method, a change caused by the rotation of the arrangement coordinates defined for the same apex in association with the first view direction, the second view direction, and the third view direction can suitably be interpolated, and an output image concerning an arbitrary output view direction can be obtained. This also corresponds to a fact that in a three-dimensional computer graphics, for example, a circular orbit represented by each apex in a case in which the rendering object rotates about a predetermined axis is expressed as an elliptic shape when rendering is performed by parallel projection (as a two-dimensional image) based on the viewpoint from a position outside the axis.

More specifically, for example, in a three-dimensional computer graphics, when a spherical body (three-dimensional model) as shown in FIG. 13A is rotated about an axis 1301 passing through the center of the spherical body, the positions of vectors $p_0$, $p_1$, and $p_2$ arranged on the spherical surface are determined on a circular (perfect circle) orbit with respect to the axis as the center for the first view direction, the second view direction, and the third view direction determined in advance (for $p_0[1]$, $p_0[1]$, $p_1[1]$, and $p_2[1]$). When rendering is performed for, for example, the viewpoint concerning the output view direction, the circular orbit becomes an elliptical orbit having the center on a line segment corresponding to the axis 1301 on the rendered two-dimensional image, as indicated by a broken line in FIG. 13A. Hence, when a vector concerning a point defined on the spherical surface in the original three-dimensional model is multiplied by a rotation matrix considering the rotation angle, the coordinates of a corresponding point can be obtained for an arbitrary output view direction. It is therefore possible to obtain the coordinates of the corresponding point conforming to a correct rotation by a simple calculation.

On the other hand, when two-dimensional images are used, in a case in which three-dimensional rendering representation showing the rotation of the spherical body is performed, for example, an arrangement of representation to obtain an effect or rendering representation including a three-dimensionally incorrect appearance can be defined for each of the first view direction, the second view direction, and the third view direction. That is, when rendering representation for discrete view directions is defined using the two-dimensional images, corresponding points can be defined at positions shifted from the ideal circular orbit on the spherical surface, like $p_1'[1]$ shown in FIG. 13B, because the three-dimensional model of the spherical body is not taken into consideration. That is, as described above in association with FIG. 6D, since the elliptical orbits on which the corresponding points are arranged at positions matching the angles concerning the defined view directions have different centers and also have different major axes and minor axes, the three-dimensional directions of the rotation axis are also different. Hence, to determine the position of the rotation center or the direction of the rotation axis in the virtual three-dimensional space to derive the elliptical orbit passing through $p_0'[1]$, $p_1'[1]$, and $p_2'[1]$ in FIG. 13B, a complex calculation with a large calculation amount is needed. In addition, performing the calculation for all constituent points of all parts is not practical because the calculation amount further increases.

To the contrary, according to this method, since the weights concerning all the constituent points of all parts, which are used to generate rendering representation for a desired output view direction based on the angles concerning the at least three types of defined view directions can be obtained by a simple calculation, it is possible to implement rotation representation associated with a change in the view direction without increasing the calculation amount, without defining a three-dimensional model, and without any failure in the method of presenting three-dimensional rendering representation by deforming two-dimensional images.

Note that in general, for three points that are discretely arranged, the number of ellipses passing through the three points is not determined to one. Hence, to specify one ellipse suitable for a rotary motion, a complex calculation is necessary. For this reason, an approach of deriving elliptical orbits for all apexes is not practical. On the other hand, according to this method, if only angles concerning the output view direction and the three types of view directions for which the arrangement coordinates of each apex are already defined are obtained, the weights can be determined. Since one ellipse representing the ideal rotation representation for each apex can easily be obtained, reduction of the calculation amount can be implemented.

Additionally, in this embodiment, to implement rotation representation that connects the images of the character defined for the first view direction, the second view direction, and the third view direction without considering the distance between the character and a virtual viewpoint to perform view, that is, purely, normalized weights as indicated by equations (3) are used. However, even if the angles for the view directions are the same, in a case in which, for example, the distance to the character is changed, the normalized weights need not be used. To guarantee suitable rotation representation, the weights used for the three types of view directions need only represent a ratio given by $$u : v : w = \sin(\theta_1 - \theta_2) + \sin(\theta_t - \theta_0) + \sin(\theta_2 - \theta_t) :$$
$$\sin(\theta_2 - \theta_0) + \sin(\theta_0 - \theta_t) + \sin(\theta_t - \theta_2) :$$
$$\sin(\theta_0 - \theta_1) + \sin(\theta_t - \theta_0) + \sin(\theta_1 - \theta_t)$$

as a matter of course.

Additionally, in this embodiment, a method has been described in which the rendering representation of the character is defined for the three types of view directions, and the rendering representation of the character for a desired output view direction is generated using the weight determined based on the relationship between an angle associated with the output view direction and angles associated with the three types of view directions. However, the implementation of the present invention is not limited to this. For example, when the rendering representation of the character is defined for view directions corresponding to 0°, 30°, 45°, and 90°, an output image in an output view direction corresponding to the range of 0° to 30° is generated using a weight determined based on the relationship of 0°, 30°, 45°, and the output angle, and an output image in an output view direction corresponding to the range of 45° to 90° is generated using a weight determined based on the relationship of 30°, 45°, 90°, and the output angle. On the other hand, for the range of 30° to 45°, an output image may be generated using a new weight obtained by compositing both the weight determined based on the relationship of 0°, 30°, 45°, and the output angle and the weight determined based on the relationship of 30°, 45°, 90°, and the output angle at a ratio according to the relative relationship between output angle and 0° or 90°. That is, when the rendering representation of the character is defined for four or more types of view directions, a plurality of weights based on three types of the view directions and the output view direction may be acquired and composited, thereby generating an output image.

[First Modification]

Figure 14:
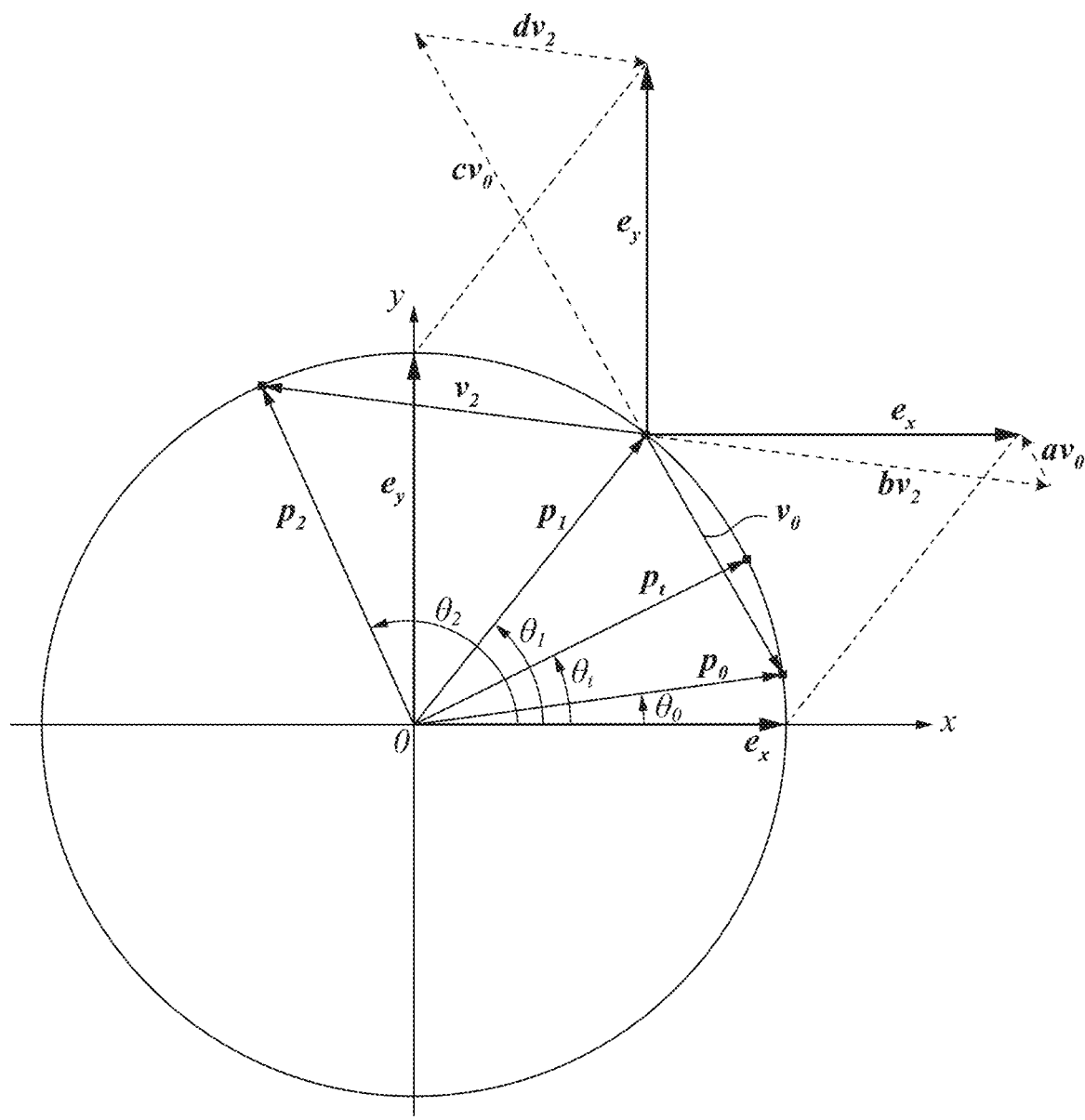
FIG. 14 is a view for explaining a weight deciding method according to the first modification of the present invention.

In the above-described embodiment, representation is performed using three types of vectors $p_1$, $p_0$-$p_1$, and $p_2$-$p_1$ defined by three points on the circumference of the unit circle with its center at the origin, which correspond to the first view direction, the second view direction, and the third view direction and using the vector $p_t$ representing a point corresponding to the output view direction, as indicated by equation (1). However, the component of the vector $p_t$ is known by the angle $\theta_t$ for the vector $p_t$. Hence, when orthonormal vectors $e_x$ and $e_y$ of a coordinate system associated with the unit circle are represented using the vectors given by $$v_0 = p_0 - p_1$$

$$v_2 = p_2 - p_1$$

we obtain $$e_x = av_0 + bv_2$$

$$e_y = cv_0 + dv_2$$

as shown in FIG. 14. Here, since the angles $\theta_0$, $\theta_1$, and $\theta_2$ that define the first view direction, the second view direction, and the third view direction are known, coefficients a, b, c, and d can be obtained by solving the simultaneous equations.

Hence, letting $p_c$ be a vector representing the origin, the vector $p_t$ of the known component is given by $$p_t = p_c + \cos\theta_t e_x + \sin\theta_t e_y$$

Similarly, the vector $p_1$ concerning the point 202 is given by $$p_1 = p_c + \cos\theta_1 e_x + \sin\theta_1 e_y$$

Hence, when $p_c$ is removed from the two equations, we obtain $$p_t = p_1 + (\cos\theta_t - \cos\theta_1)e_x + (\sin\theta_t - \sin\theta_1)e_y$$

For this reason, when the orthonormal vectors are expressed as the vectors $p_0$-$p_1$ and $p_2$-$p_1$ using the established coefficients a, b, c, and d, the same expression as equation (2) is eventually obtained, and the equation can finally be modified into $$p_t = up_0 + vp_1 + wp_2$$

That is, the same weights u, v, and w as in equations (3) can be obtained by this calculation method.

[Second Embodiment]

In the above-described first embodiment, a method of deriving a weight by representing the point 204 on the circumference corresponding to the output view direction using vectors directed from the point 202 on the circumference corresponding to the second view direction shown in FIG. 2 to the points 201 and 203 on the circumference corresponding to the other view directions has been described. In this embodiment, a method of deriving a weight by representing the point on the circumference corresponding to the output view direction using another method will be described. Note that a PC 100 according to this embodiment has the same arrangement as the PC 100 according to the first embodiment except that the weight deciding method of a weight deciding unit 105 is different, and a description of each component will be omitted.

<<Weight Deciding Method>>

Figure 7A:
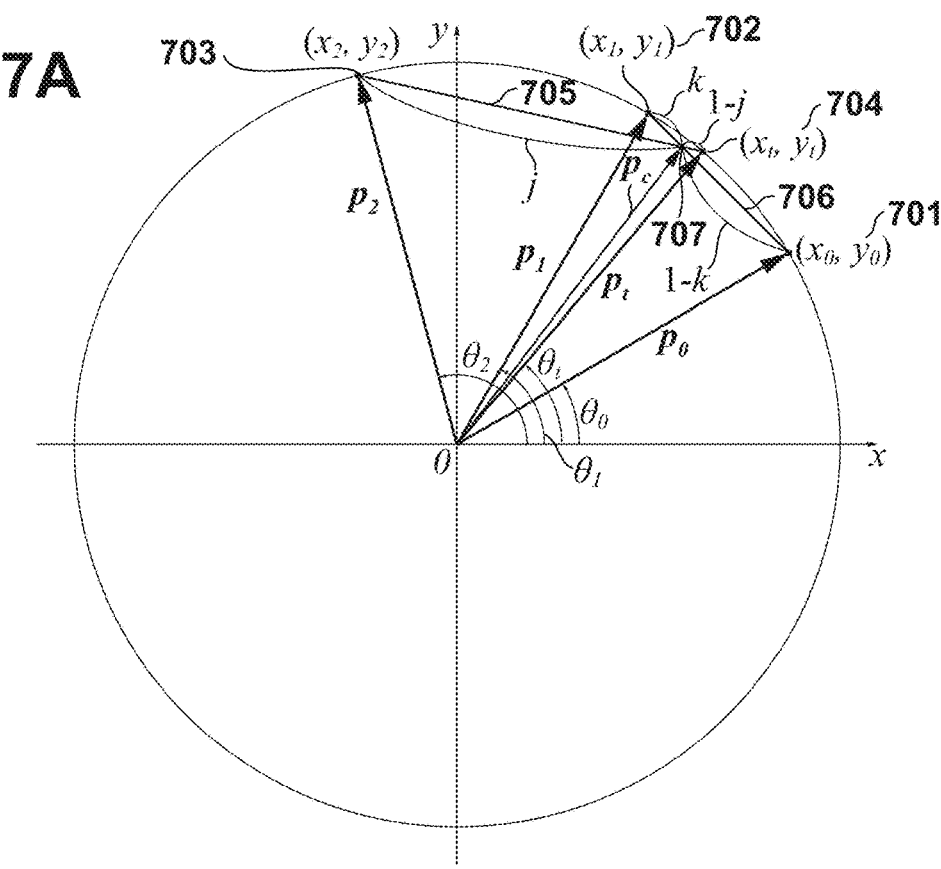
FIGS. 7A and 7B are views for explaining a weight deciding method according to the second embodiment of the present invention.
Figure 7B:
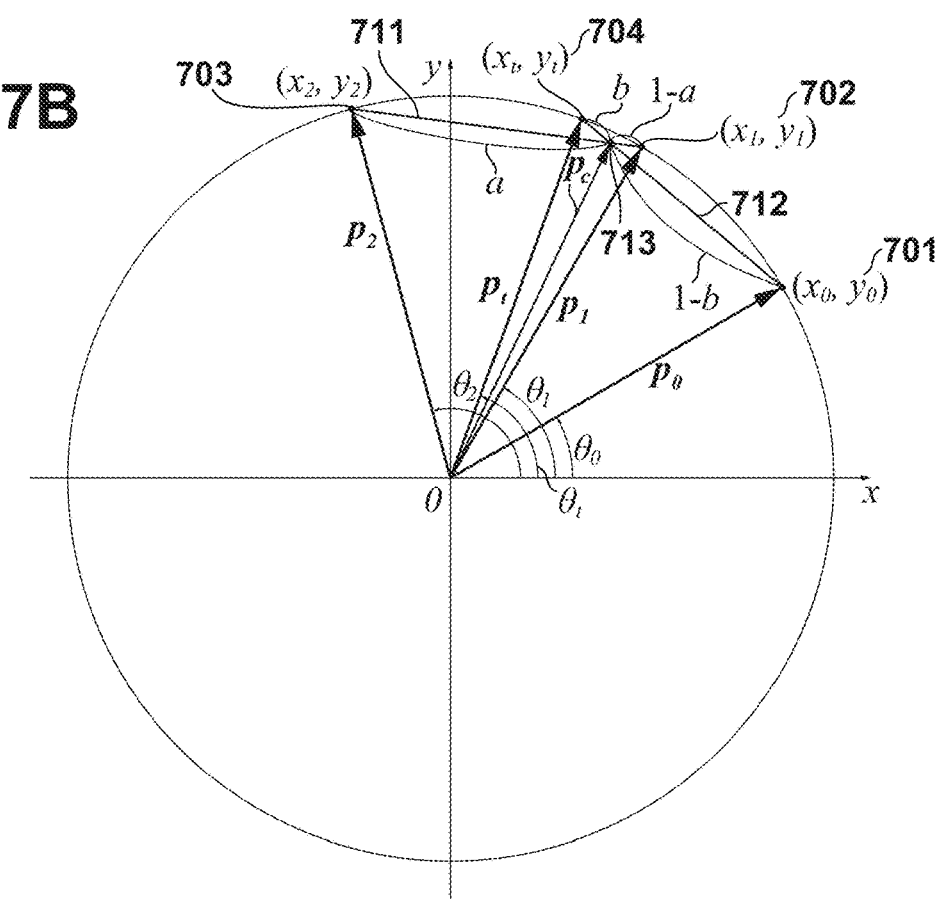

A weight deciding method used by the weight deciding unit 105 according to this embodiment will be described below with reference to FIGS. 7A and 7B. Each of FIGS. 7A and 7B shows a unit circle with its center at the origin, like FIG. 2, and $p_0$, $p_1$, and $p_2$ are vectors indicating points 701, 702, and 703 on the circumference corresponding to the first view direction, the second view direction, and the third view direction. In addition, $p_t$ is a vector indicating a point 704 corresponding to the output view direction. In the weight deciding method according to this embodiment, $\theta_0 < \theta_1 < \theta_2$. The weight deriving method changes between a case in which $\theta_0 < \theta_t < \theta_1$, as shown in FIG. 7A and a case in which $\theta_1 < \theta_t < \theta_2$, as shown in FIG. 7B.

<1. Case in Which $\theta_0 < \theta_t < \theta_1$>

In FIG. 7A, let $p_c$ be a vector indicating an intersection 707 between a line segment 705 connecting the point 703 and the point 704 and a line segment 706 connecting the point 701 and the point 702. As shown in FIG. 7A, since the intersection 707 internally divides the line segment 705 to j:(1−j) and internally divides the line segment 706 to k:(1−k), $$\begin{cases} p_c = (1-j)p_2 + jp_t \\ p_c = kp_0 + (1-k)p_1 \end{cases}$$

$$\Rightarrow jp_t = kp_0 + (1-k)p_1 - (1-j)p_2 \quad (4)$$

$$\Rightarrow j(p_2 - p_t) + k(p_0 - p_1) = p_2 - p_1 \quad (5)$$

hold. Here, when equation (5) is modified, j and k can be expressed as a determinant given by $$\begin{bmatrix} \cos\theta_2 - \cos\theta_t & \cos\theta_0 - \cos\theta_1 \\ \sin\theta_2 - \sin\theta_t & \sin\theta_0 - \sin\theta_1 \end{bmatrix} \begin{bmatrix} j \\ k \end{bmatrix} = \begin{bmatrix} \cos\theta_2 - \cos\theta_1 \\ \sin\theta_2 - \sin\theta_1 \end{bmatrix}$$

When the determinant is solved using the addition theorem of a trigonometric function, we obtain $$\begin{bmatrix} 1 & 0 \\ 0 & 1 \end{bmatrix} \begin{bmatrix} j \\ k \end{bmatrix} = \begin{bmatrix} \frac{\sin(\theta_0 - \theta_2) + \sin(\theta_1 - \theta_0) + \sin(\theta_2 - \theta_1)}{\sin(\theta_0 - \theta_2) + \sin(\theta_2 - \theta_1) + \sin(\theta_t - \theta_0) + \sin(\theta_1 - \theta_t)} \\ \frac{\sin(\theta_2 - \theta_1) + \sin(\theta_1 - \theta_t) + \sin(\theta_t - \theta_2)}{\sin(\theta_0 - \theta_2) + \sin(\theta_2 - \theta_1) + \sin(\theta_t - \theta_0) + \sin(\theta_1 - \theta_t)} \end{bmatrix}$$

On the other hand, when equation (4) is modified, we obtain $$p_t = up_0 + vp_1 + wp_2$$

$$\therefore u = \frac{k}{j}, v = \frac{1-k}{j}, w = \frac{j-1}{j}$$

and $p_t$ corresponding to the output view direction can be expressed as a formula of weighted addition using vectors $p_0$, $p_1$, and $p_2$ and weights u, v, and w for the vectors, as in the first embodiment.

Hence, the weights for the first view direction, the second view direction, and the third view direction can be obtained by $$u = \frac{\sin(\theta_2 - \theta_1) + \sin(\theta_1 - \theta_t) + \sin(\theta_t - \theta_2)}{\sin(\theta_1 - \theta_0) + \sin(\theta_2 - \theta_1) + \sin(\theta_0 - \theta_2)} =$$

$$\frac{\sin(\theta_1 - \theta_2) + \sin(\theta_t - \theta_0) + \sin(\theta_2 - \theta_t)}{\sin(\theta_0 - \theta_1) + \sin(\theta_1 - \theta_2) + \sin(\theta_2 - \theta_0)}$$

$$v = \frac{\sin(\theta_0 - \theta_2) + \sin(\theta_t - \theta_0) + \sin(\theta_2 - \theta_t)}{\sin(\theta_1 - \theta_0) + \sin(\theta_2 - \theta_1) + \sin(\theta_0 - \theta_2)} =$$

$$\frac{\sin(\theta_2 - \theta_0) + \sin(\theta_0 - \theta_t) + \sin(\theta_t - \theta_2)}{\sin(\theta_0 - \theta_1) + \sin(\theta_1 - \theta_2) + \sin(\theta_2 - \theta_0)}$$

$$w = \frac{\sin(\theta_1 - \theta_0) + \sin(\theta_0 - \theta_t) + \sin(\theta_t - \theta_1)}{\sin(\theta_1 - \theta_0) + \sin(\theta_2 - \theta_1) + \sin(\theta_0 - \theta_2)} =$$

$$\frac{\sin(\theta_0 - \theta_1) + \sin(\theta_t - \theta_0) + \sin(\theta_1 - \theta_t)}{\sin(\theta_0 - \theta_1) + \sin(\theta_1 - \theta_2) + \sin(\theta_2 - \theta_0)}$$

That is, the same weights as in equations (3) of the first embodiment can be obtained by the method of solving the simultaneous equations concerning the line segments 705 and 706 in the case in which $\theta_0 < \theta_t < \theta_1$.

<2. Case in Which $\theta_1 < \theta_t < \theta_2$>

In FIG. 7B, let $p_c$ be a vector indicating an intersection 713 between a line segment 711 connecting the point 702 and the point 703 and a line segment 712 connecting the point 704 and the point 701. As shown in FIG. 7B, since the intersection 713 internally divides the line segment 711 to a:(1−a) and internally divides the line segment 712 to b:(1−b), $$\begin{cases} p_c = ap_1(1-a)p_2 \\ p_c = bp_0 + (1-b)p_t \end{cases}$$

$$\Rightarrow (1-b)p_t = -bp_0 + ap_1 + (1-a)p_2 \quad (6)$$

$$\Rightarrow a(p_1 - p_2) + b(p_t - p_0) = p_t - p_2 \quad (7)$$

hold. Here, when equation (7) is modified, a and b can be expressed as a determinant given by $$\begin{bmatrix} \cos\theta_1 - \cos\theta_2 & \cos\theta_t - \cos\theta_0 \\ \sin\theta_1 - \sin\theta_2 & \sin\theta_t - \sin\theta_0 \end{bmatrix} \begin{bmatrix} a \\ b \end{bmatrix} = \begin{bmatrix} \cos\theta_t - \cos\theta_2 \\ \sin\theta_t - \sin\theta_2 \end{bmatrix}$$

When the determinant is solved using the addition theorem of a trigonometric function, we obtain $$\begin{bmatrix} 1 & 0 \\ 0 & 1 \end{bmatrix} \begin{bmatrix} a \\ b \end{bmatrix} = \begin{bmatrix} \frac{\sin(\theta_0 - \theta_2) + \sin(\theta_t - \theta_0) + \sin(\theta_2 - \theta_t)}{\sin(\theta_1 - \theta_0) + \sin(\theta_0 - \theta_2) + \sin(\theta_t - \theta_1) + \sin(\theta_2 - \theta_t)} \\ \frac{\sin(\theta_1 - \theta_2) + \sin(\theta_t - \theta_1) + \sin(\theta_2 - \theta_t)}{\sin(\theta_1 - \theta_0) + \sin(\theta_0 - \theta_2) + \sin(\theta_t - \theta_1) + \sin(\theta_2 - \theta_t)} \end{bmatrix}$$

On the other hand, when equation (6) is modified, we obtain $$p_t = up_0 + vp_1 + wp_2$$

$$\therefore u = \frac{-b}{1-b}, v = \frac{a}{1-b}, w = \frac{1-a}{1-b}$$

and $p_t$ corresponding to the output view direction can be expressed as a formula of weighted addition using the vectors $p_0$, $p_1$, and $p_2$ and the weights u, v, and w for the vectors, as in the first embodiment.

Hence, the weights for the first view direction, the second view direction, and the third view direction can be obtained by $$u = \frac{\sin(\theta_2 - \theta_1) + \sin(\theta_1 - \theta_t) + \sin(\theta_t - \theta_2)}{\sin(\theta_1 - \theta_0) + \sin(\theta_2 - \theta_1) + \sin(\theta_0 - \theta_2)} =$$
$$\frac{\sin(\theta_1 - \theta_2) + \sin(\theta_t - \theta_0) + \sin(\theta_2 - \theta_t)}{\sin(\theta_0 - \theta_1) + \sin(\theta_1 - \theta_2) + \sin(\theta_2 - \theta_0)}$$

$$v = \frac{\sin(\theta_0 - \theta_2) + \sin(\theta_t - \theta_0) + \sin(\theta_2 - \theta_t)}{\sin(\theta_1 - \theta_0) + \sin(\theta_2 - \theta_1) + \sin(\theta_0 - \theta_2)} =$$
$$\frac{\sin(\theta_2 - \theta_0) + \sin(\theta_0 - \theta_1) + \sin(\theta_t - \theta_2)}{\sin(\theta_0 - \theta_1) + \sin(\theta_1 - \theta_2) + \sin(\theta_2 - \theta_0)}$$

$$w = \frac{\sin(\theta_1 - \theta_0) + \sin(\theta_0 - \theta_t) + \sin(\theta_t - \theta_1)}{\sin(\theta_1 - \theta_0) + \sin(\theta_2 - \theta_1) + \sin(\theta_0 - \theta_2)} =$$
$$\frac{\sin(\theta_0 - \theta_1) + \sin(\theta_t - \theta_0) + \sin(\theta_1 - \theta_t)}{\sin(\theta_0 - \theta_1) + \sin(\theta_1 - \theta_2) + \sin(\theta_2 - \theta_0)}$$

That is, the same weights as in equations (3) of the first embodiment can be obtained by the method of solving the simultaneous equations concerning the line segments 711 and 712 in the case in which $\theta_1 < \theta_t < \theta_2$.

In addition, for conditions $\theta_t > \theta_0$ and $\theta_t > \theta_2$, the intersection internally dividing the line segment 705 or 711 cannot be obtained by the method of solving the simultaneous equations for the intersection of the two line segments shown in FIGS. 7A and 7B. However, not a line segment but a straight line is drawn, thereby obtaining an intersection outside the unit circle. In this case, the simultaneous equations for the intersection can be solved using an external ratio, and the same weights can be derived. Alternatively, instead of using the external ratio, in a case in which the rendering representation of a character is defined for view directions corresponding to, for example, 0°, 60°, and 90°, when generating an output image for an output view direction corresponding to 110°, an intersection for internal division may be obtained by changing the combination to 60°, 90°, and 360° (the angle representation of 0° is changed) and an angle corresponding to the output view direction. Hence, the weights can be derived eventually by equations (3) for any output view direction.

[Second Modification]

In the first and second embodiments and the first modification described above, a form in which a view direction is defined based on a vector defined in one virtual plane, as shown in FIG. 5A, that is, a form in which a view direction is defined by setting an angle concerning a rotation angle of one axis has been described. However, the implementation of the present invention is not limited to this.

Figure 8A:
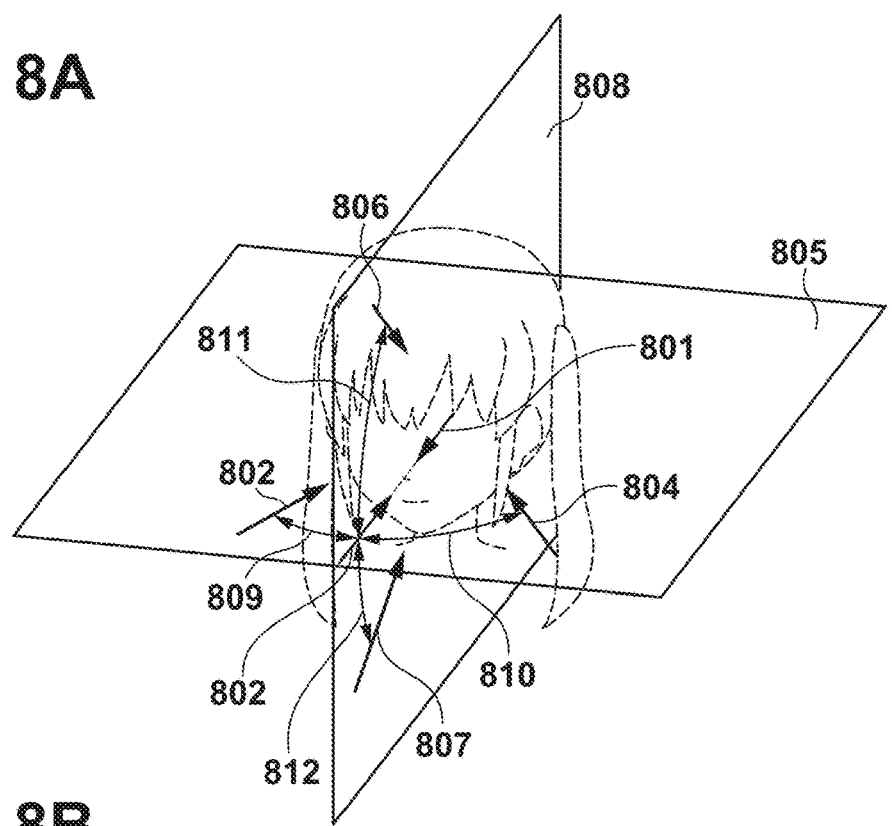
FIGS. 8A and 8B are views for explaining view directions and output images of a character defined for the respective directions according to a modification of the present invention.

For example, as shown in FIG. 8A, when a view direction is defined based on a vector defined on each of two crossing virtual planes, it is possible to cope with rotation about two axes as well. In the example shown in FIG. 8A, vectors 802, 803, and 804 indicating the view directions are defined in a virtual plane 805, and vectors 803, 806, and 807 are similarly defined in a virtual plane 808. That is, the vector 803 exists on a straight line determined when the two virtual planes cross, and is included in both virtual planes. Additionally, in the example shown in FIG. 8A, a reference direction indicated by a vector 801 is determined to face the second view direction indicated by the vector 803.

Hence, three types of view directions determined based on the vectors included in the virtual plane 805 are managed by angles made by the vector 801 of the reference direction and the vectors 802 to 804. In FIG. 8A, $\theta_0 = -30°$ (angle 809), $\theta_1 = 0°$ (since the vector faces the reference direction), and $\theta_2 = 45°$ (angle 810). Similarly, three types of view directions determined based on the vectors included in the virtual plane 808 are managed by angles made by the vector 801 of the reference direction and the vectors 806, 803, and 807. In FIG. 8A, $\phi_3 = 45°$ (angle 811), $\phi_1 = 0°$ (since the vector faces the reference direction), and $\phi_4 = -30°$ (angle 812).

Figure 8B:
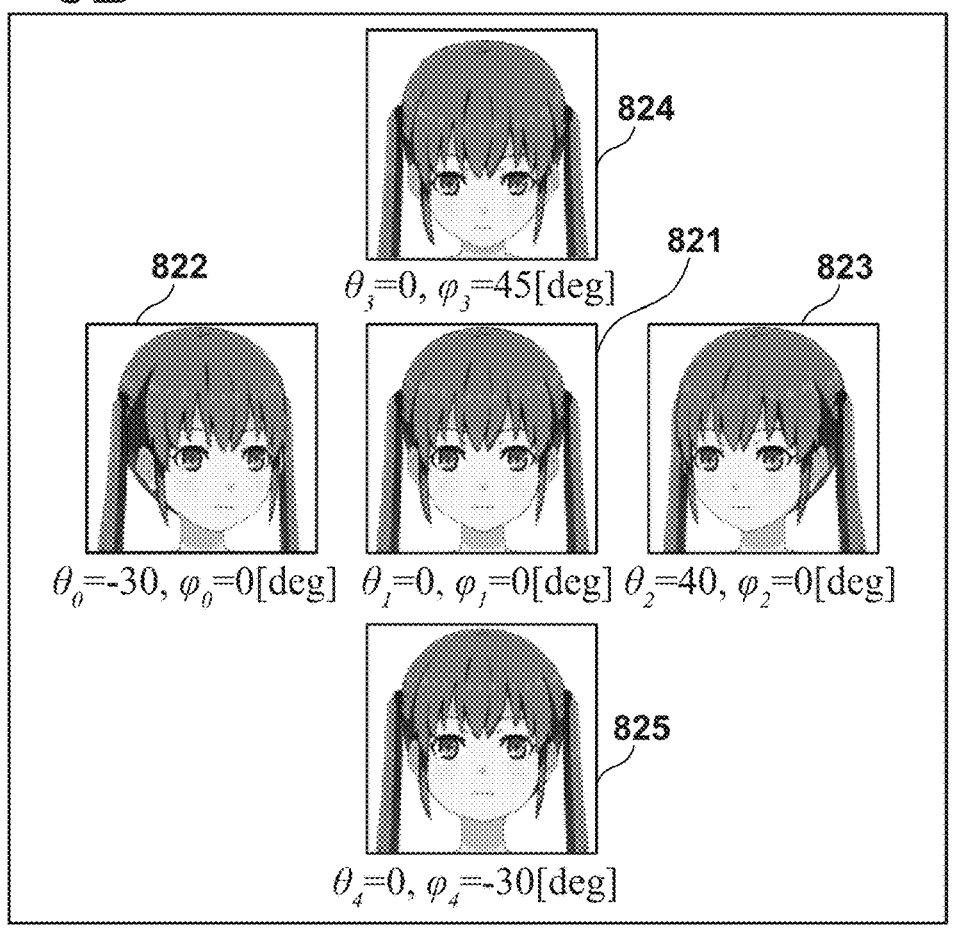

In this case, when the arrangement coordinates of the apexes of parts are defined as shown in FIG. 8B for three view directions in each virtual plane, that is, at least five types of view directions, as shown in FIG. 8A, three-dimensional rendering representation from an arbitrary view direction that the included parts can cope with can be implemented by compositing the weights derived for each virtual plane (FIG. 8B shows output images 821 and 822 to 825 of the character associated with definition information for the view directions indicated by 0° and the angles 809 to 812). More specifically, in a case in which five types of output view directions as shown in FIG. 8B are determined by a yaw component $\theta_t$ and a pitch component $\phi_t$, when a point determined by the two rotation angles on a unit spherical surface is expressed as a formula of weighted addition using the vectors for the view directions, the arrangement coordinates of the apexes of the parts for the output view direction can be derived, as in the first embodiment.

For example, first, a weight concerning the view direction of only the angle $\theta_t$ in the virtual plane 805 is decided based on the angles $\theta_0$, $\theta_1$, $\theta_2$, and $\theta_t$ made with the reference direction in the virtual plane 805. At this time, a point obtained by rotating a point concerning the view direction of only the angle $\theta_t$ about the origin by the angle $\phi_t$ becomes a point (vector) on the unit spherical surface concerning the output view direction. Hence, a weight decided for the view direction of only the angle $\phi_t$ in the virtual plane 808 based on the angles $\phi_3$, $\phi_1$, $\phi_4$, and $\phi_t$ made with the reference direction in the virtual plane 808 is added to the weight concerning the view direction of only the angle $\theta_t$ including a displacement on the unit spherical surface, thereby deriving weights concerning the five types of view directions.

When the arrangement coordinates of the apexes of the parts are defined not only for the five types of view directions but for nine types of view directions (($\theta_1$, $\phi_1$), ($\theta_2$, $\phi_1$), ($\theta_3$, $\phi_1$), ($\theta_1$, $\phi_2$), ($\theta_2$, $\phi_2$), ($\theta_3$, $\phi_2$), ($\theta_1$, $\phi_3$), ($\theta_2$, $\phi_3$), and ($\theta_3$, $\phi_3$)), a rotary motion of rendering representation desired by the designer can be obtained only by deforming two-dimensional images.

[Third Embodiment]

In the first and second embodiments and the first and second modifications described above, the description has been made assuming that the weight for the rendering representation of the character in the output view direction is derived based on the relationship of points corresponding to the angles for the three types of view directions defined in advance and the output view direction on the unit circle circumference. However, particularly in a case in which, for example, three-dimensional representation for rotating a character while keeping an equidistance to a predetermined central axis as shown in FIGS. 10A and 10B is implemented, the method using the unit circle implements representation for making a transition while drawing a perfect circle orbit about an arbitrary rotation axis (drawing an elliptical orbit in an output image (two-dimensional)) along with a change in the view direction in a three-dimensional space in which an arbitrary apex is virtually defined. However, the present invention is not limited to this.

That is, in the three-dimensional rotation representation of the character, the movement of the arbitrary apex along with the change in the view direction need not be done based on the perfect circle orbit in the three-dimensional space, and may be done based on, for example, an elliptical orbit. In this case, the weight decision may be performed based on an associated ellipse 1501 as shown in FIG. 15A. That is, for an angle of deviation determined by, for example, the center of the ellipse 1501 and the major axis, an angle for the view direction may be assigned as in the case of the unit circle, and the weight for the output view direction may be derived using a coefficient when a vector concerning a point $p_t$ on the elliptical circumference corresponding to the angle in the output view direction is represented by vectors concerning points $p_0$, $p_1$, and $p_2$ on the elliptical circumference corresponding to the angles in the first view direction, the second view direction, and the third view direction.

At this time, if the angles in the first view direction, the second view direction, and the third view direction are $\theta_0$, $\theta_1$, and $\theta_2$ and the angle in the output view direction is $\theta_t$, the point $p_t$ on the elliptical circumference corresponding to the angle in the output view direction and the points $p_0$, $p_1$, and $p_2$ are solved, using a long radius (a half of the major axis length) a of the ellipse and a short radius (a half of the minor axis length) b, by $$p_t = (a \cos \theta_t, b \sin \theta_t)$$

$$p_0 = (a \cos \theta_0, b \sin \theta_0)$$

$$p_1 = (a \cos \theta_1, b \sin \theta_1)$$

$$p_2 = (a \cos \theta_2, b \sin \theta_2)$$

thereby obtaining the same weight as that derived based on the orbit on the perfect circle.

In addition, the method of deciding the weight based on a closed curve like a unit circle or an ellipse having a positive curvature viewed from the origin that is the reference of angle definition has been described above. However, the implementation of the present invention is not limited to this. For example, as shown in FIG. 15B, a Bezier curve 1502 as an open curve with a positive curvature may be defined for a specific angle range, and a coefficient when a point on the curve corresponding to the output view direction is represented by vectors defined by points on the curve circumference corresponding to the first view direction, the second view direction, and the third view direction may be used as a weight.

Figure 16A:
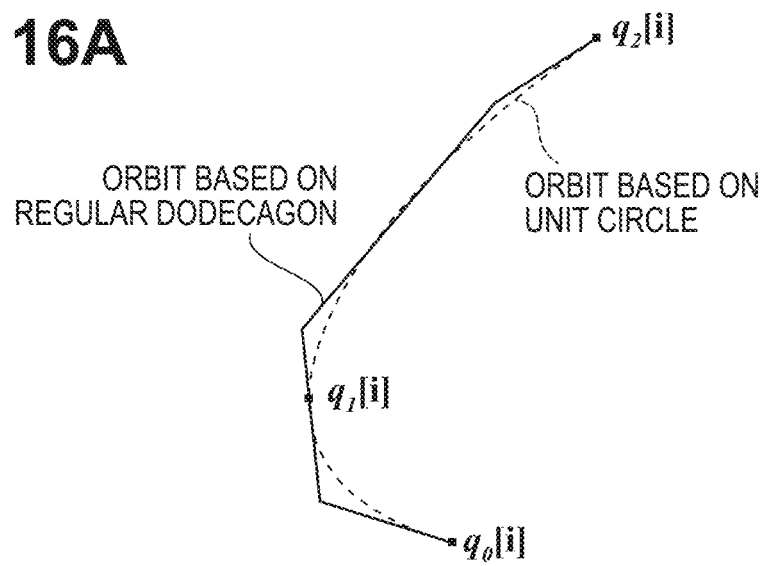
FIGS. 16A, 16B, and 16C are views showing arrangement coordinates derived in association with an output view direction according to the third embodiment of the present invention.
Figure 16B:
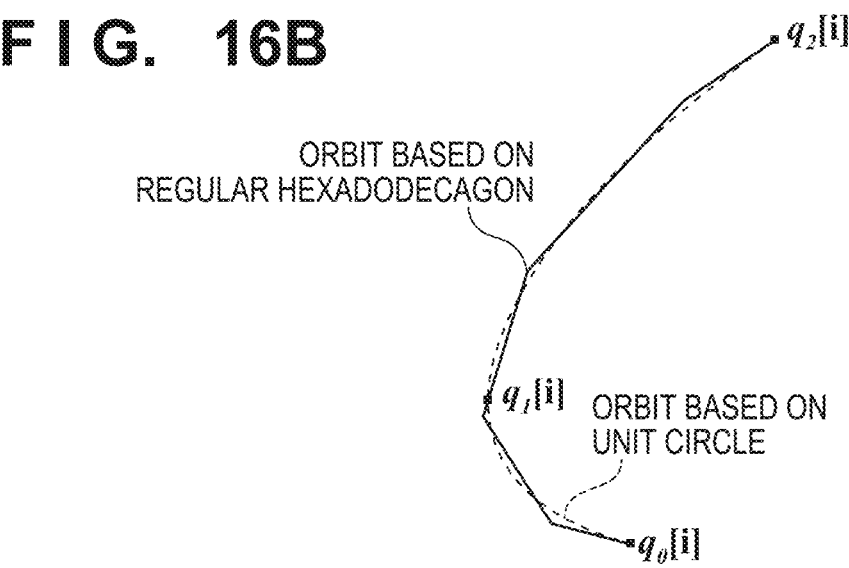
Figure 16C:
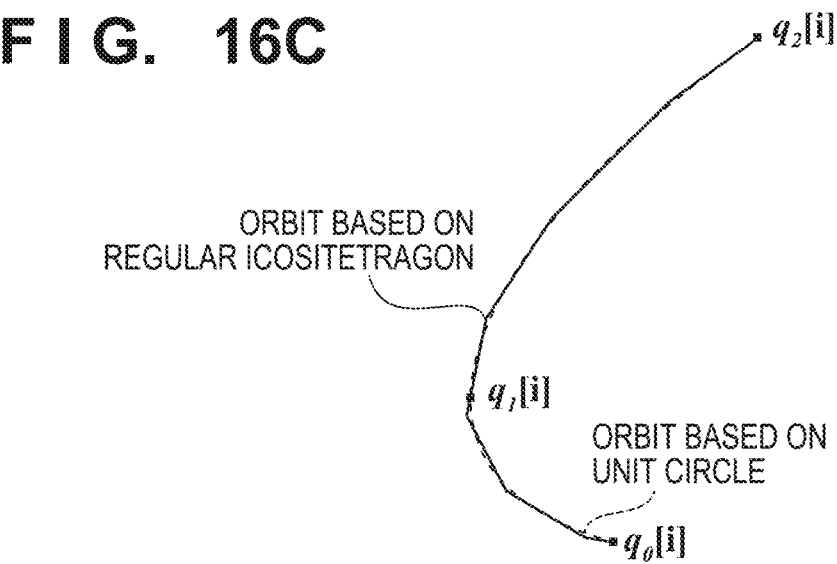

Alternatively, for example, as shown in FIG. 15C, the weight may be decided based on a polygonal line 1503 (formed by connecting discrete points on the circumference of the unit circle in the example shown in FIG. 15C) that approximates the curve with the positive curvature. When the polygonal line is used for the weight decision, the orbit of feature points according to the change in the view direction also have a polygonal line shape, as shown in, for example, FIGS. 16A to 16C. However, the higher the degree of approximation is, that is, the larger the number of apexes defining the polygonal line within the predetermined angle range is, the closer the orbit becomes to the orbit of feature points according to the change in the view direction, which is determined by the weight based on the unit circle.

Note that to suitably implement the rendering representation concerning the rotation of the view direction, the maximum value, change rate, or change width of a curvature concerning an open curve or a curve approximated to a polygonal line as described above may be limited to a predetermined range. That is, unlike a perfect circle or an ellipse, in a form in which an arbitrary point on a curve used for the weight decision cannot be represented simply as a function of an angle, for example, as the difference from the curvature of the unit circle becomes large, the orbit separates from the orbit of feature points according to the change in the view direction, which is based on the weight using the unit circle. Hence, since the change in the arrangement positions of the feature points may be steep in a specific angle range, and it may be impossible to obtain rendering representation for suitable rotation, at least one of the maximum value, change rate, and change width of the curvature of the curve for the weight decision may be limited.

Hence, in the implementation of the present invention, it can be understood that any curve can be used if it can decide, as the weight, a coefficient when the vector of a point corresponding to the angle for an arbitrary output view direction on the curve is represented using the vectors of points corresponding to at least three types of angles determined in advance on the curve based on the curve (including a polygonal line) having the positive curvature and associated with the angle for the view direction. As for rendering representation concerning the rotation of the view direction, a curve having a positive curvature is preferably used. However, for rendering representation that is not rotation, it should be understood that the curvature is not limited to a positive curvature.

[Third Modification]

In the first to third embodiments and the first and second modifications described above, a form in which three-dimensional rotation representation is implemented for an object formed by the parts of two-dimensional images has been described. However, the implementation of the present invention is not limited to such a form in which the two-dimensional images are deformed.

For example, contents that conversely employ cell shading for obtaining two-dimensional rendering representation like a 2D animation or comic in rendering of a three-dimensional model include contents that are controlled to define to use a three-dimensional model of another pattern or specially deform part of the model for a specific view direction or the like such that the above-described representation unique to a two-dimensional image is guaranteed. In such a content, morphing is sometimes performed for the corresponding points of the three-dimensional model such that the change of the three-dimensional model concerning the control or transition to the partial deformation is smoothly performed. However, it can easily be understood that the present invention can be used to decide such morphing parameters for the view direction.

[Fourth Modification]

In the first to third embodiments and the first and second modifications described above, the description has been made assuming that the arrangement coordinates of apexes determined for each part are decided by weighted addition. However, the present invention is not limited to use for such decision of arrangement coordinates. In an arrangement in which a depth value is managed for each apex, similar weighted addition may be performed for the depth values and, for example, the presence/absence of shielding may be determined, or the presence/absence of addition of shading may be determined. In addition, the present invention is also usable to decide the brightness or color of each apex for the output view direction by performing weighted addition using a similar weight to represent not only a value representing such a positional relationship but also, for example, transition of a brightness or color that changes in accordance with the view direction.

[Other Embodiments]

The present invention is not limited to the above embodiments, and various changes and modifications can be made within the spirit and scope of the present invention. In addition, the information processing apparatus according to the present invention can be implemented by a program that causes one or more computers to function the information processing apparatus. The program can be provided/distributed by being recorded in a computer-readable recording medium or via a telecommunication network. Therefore, to apprise the public of the scope of the present invention, the following claims are made.

The invention claimed is:

1. A non-transitory computer-readable recording medium recording a program for causing a computer to execute processing of deriving an influence degree to rendering representation for each of at least three types of view directions including a first view direction, a second view direction, and a third view direction when generating rendering representation of a target object concerning an output view direction based on the rendering representation of the target object defined for each of the at least three types of view directions, wherein the program causes the computer to execute:
acquisition processing of acquiring information representing an angle concerning a view direction for each of the first view direction, the second view direction, and the third view direction and the output view direction; and
deriving processing of deriving the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

2. The recording medium according to claim 1, wherein reference coordinates are defined for the curve, and
in the deriving processing, each of coefficients of a first vector, a second vector, and a third vector when an output vector directed from the reference coordinates to a point on the curve corresponding to an angle concerning the output view direction is represented by the first vector directed from the reference coordinates to a point on the curve corresponding to an angle concerning the first view direction, the second vector directed from the reference coordinates to a point on the curve corresponding to an angle concerning the second view direction, and the third vector directed from the reference coordinates to a point on the curve corresponding to an angle concerning the third view direction is derived as the influence degree.

3. The recording medium according to claim 2, wherein the curve is a curve having a positive curvature for the reference coordinates.

4. The recording medium according to claim 3, wherein the curve includes a polygonal line that approximates the curve having the positive curvature.

5. The recording medium according to claim 3, wherein the curve is a curve defined by limiting at least one of a maximum value, a change rate, and a change width of the curvature.

6. The recording medium according to claim 1, wherein the first view direction, the second view direction, and the third view direction are defined based on a direction to the target object on a first virtual plane defined for the target object, and
the angle concerning each of the first view direction, the second view direction, and the third view direction is an angle made by a direction vector corresponding to each view direction on the first virtual plane and a reference vector determined for the target object.

7. The recording medium according to claim 6, wherein the at least three types of view directions further include three types of view directions defined based on a direction to the target object on a second virtual plane crossing the first virtual plane,
in the acquisition processing, information representing an angle of two axes based on the first virtual plane and the second virtual plane is acquired for the output view direction, and
in the deriving processing, the influence degree to the rendering representation of the target object concerning some angle components of the angle of the two axes in the output view direction, which is derived for the first virtual plane, and the influence degree to the rendering representation of the target object concerning some remaining angle components of the angle of the two axes in the output view direction, which is derived for the second virtual plane, are composited, thereby deriving the influence degree of the rendering representation of the target object concerning each of the at least three types of view directions.

8. An information processing apparatus for deriving an influence degree to rendering representation for each of at least three types of view directions including a first view direction, a second view direction, and a third view direction when generating rendering representation of a target object concerning an output view direction based on the rendering representation of the target object defined for each of the at least three types of view directions, comprising:
an acquisition unit configured to acquire information representing an angle concerning a view direction for each of the first view direction, the second view direction, and the third view direction and the output view direction; and
a deriving unit configured to derive the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

9. An influence degree deriving method of deriving an influence degree to rendering representation for each of at least three types of view directions including a first view direction, a second view direction, and a third view direction when generating rendering representation of a target object concerning an output view direction based on the rendering representation of the target object defined for each of the at least three types of view directions, comprising:
an acquisition step of acquiring information representing an angle concerning a view direction for each of the first view direction, the second view direction, and the third view direction and the output view direction; and
a deriving step of deriving the influence degree of the rendering representation of the target object concerning each of the first view direction, the second view direction, and the third view direction to the rendering representation of the target object concerning the output view direction based on a curve determined in advance as a reference of rotation of the target object, for which a point on a line corresponding to the angle concerning the view direction is determined.

10. A non-transitory computer-readable recording medium recording a program for causing a computer to execute processing of generating an output image of rendering representation of a target object concerning an output view direction, wherein the program causes the computer to execute:
  decision processing of deciding the output view direction to generate the output image; and
  generation processing of generating the output image based on an influence degree derived by an influence degree deriving method of claim 9 and rendering representation concerning each of the first view direction, the second view direction, and the third view direction.

11. The recording medium according to claim 10, wherein
  the rendering representation concerning each view direction is defined by pieces of information of a plurality of feature points concerning a part that forms the target object, and
  in the generation processing, the output image is generated by performing weighted addition of the pieces of information of the plurality of feature points defined for each of the first view direction, the second view direction, and the third view direction based on the influence degree.

12. The recording medium according to claim 10, wherein
  the rendering representation concerning each view direction is provided as a two-dimensional image by arranging a plurality of feature points concerning a part that forms the target object at arrangement positions defined for the view direction, and
  in the generation processing, the output image is generated by performing weighted addition of the arrangement positions of the feature points defined for each of the first view direction, the second view direction, and the third view direction based on the influence degree and deforming the part that forms the target object such that the feature points are arranged at positions obtained by the weighted addition.

13. The recording medium according to claim 12, wherein each of parts that form the target object is a two-dimensional image, and a plurality of feature points are defined.

14. The recording medium according to claim 12, wherein in the generation processing, the weighted addition is performed based on the same influence degree for all of the plurality of feature points concerning the parts that form the target object.

15. The recording medium according to claim 10, wherein in the generation processing, in a case in which the influence degree derived by the influence degree deriving method for the output view direction does not exist, influence degrees derived by the influence degree deriving method for a plurality of view directions are composited and used to generate the output image.

16. An information processing apparatus for generating an output image of rendering representation of a target object concerning an output view direction, comprising:
  a decision unit configured to decide the output view direction to generate the output image; and
  a generation unit configured to generate the output image based on an influence degree derived by an influence degree deriving method of claim 9 and rendering representation concerning each of the first view direction, the second view direction, and the third view direction.

17. An image generation method of generating an output image of rendering representation of a target object concerning an output view direction, comprising:
  a decision step of deciding the output view direction to generate the output image; and
  a generation step of generating the output image based on an influence degree derived by an influence degree deriving method of claim 9 and rendering representation concerning each of the first view direction, the second view direction, and the third view direction.

* * * * *